(12) United States Patent
Takita et al.

(10) Patent No.: US 8,906,539 B2
(45) Date of Patent: Dec. 9, 2014

(54) POLYOLEFIN COMPOSITION, ITS PRODUCTION METHOD, AND A BATTERY SEPARATOR MADE THEREFROM

(75) Inventors: Kotaro Takita, Nasushiobara (JP); Shintaro Kikuchi, Saitama (JP)

(73) Assignee: Toray Battery Separator Film Co., Ltd, Tochigi (JP)

( * ) Notice: Subject to any disclaimer, the term of this patent is extended or adjusted under 35 U.S.C. 154(b) by 800 days.

(21) Appl. No.: 12/375,877

(22) PCT Filed: Aug. 1, 2007

(86) PCT No.: PCT/JP2007/065470
§ 371 (c)(1),
(2), (4) Date: Jan. 30, 2009

(87) PCT Pub. No.: WO2008/016174
PCT Pub. Date: Feb. 7, 2008

(65) Prior Publication Data
US 2010/0003591 A1  Jan. 7, 2010

(30) Foreign Application Priority Data
Aug. 1, 2006  (JP) ................. 2006-210307

(51) Int. Cl.
| H01M 2/16 | (2006.01) |
| B32B 27/32 | (2006.01) |
| C08L 23/04 | (2006.01) |
| C08L 23/06 | (2006.01) |
| C08L 23/10 | (2006.01) |
| C08L 23/08 | (2006.01) |

(52) U.S. Cl.
CPC ............ *B32B 27/32* (2013.01); *C08L 2205/02* (2013.01); *C08L 23/10* (2013.01); *C08L 2205/03* (2013.01); *C08L 23/0815* (2013.01); *C08L 23/04* (2013.01); *C08L 23/06* (2013.01)
USPC .......................................................... 429/144

(58) Field of Classification Search
USPC ......................................... 429/144, 163, 145
See application file for complete search history.

(56) References Cited

U.S. PATENT DOCUMENTS

| 6,566,012 | B1 | 5/2003 | Takita et al. |
| 6,666,969 | B1 | 12/2003 | Funaoka et al. |
| 2002/0034689 | A1 | 3/2002 | Hoshida et al. |
| 2003/0035943 | A1* | 2/2003 | Jones et al. ............... 428/317.9 |
| 2006/0055075 | A1 | 3/2006 | Hoshida et al. |

(Continued)

FOREIGN PATENT DOCUMENTS

| EP | 0 547 237 A1 | 6/1993 |
| EP | 1 168 469 A2 | 1/2002 |

(Continued)

OTHER PUBLICATIONS

European Search Report dated Aug. 13, 2012, issued in European patent application No. 07 792 138.5.

*Primary Examiner* — Larry Thrower
(74) *Attorney, Agent, or Firm* — Sughrue Mion, PLLC

(57) ABSTRACT

The invention relates to a polyolefin composition. The polyolefin composition can be in the form of a multi-layer, microporous polyolefin membrane comprising a first microporous layer containing 7% or less by mass of ultra-high-molecular-weight polyethylene having a weight-average molecular weight of $1\times10^6$ or more, and having a structure in which a pore size distribution curve obtained by mercury intrusion porosimetry has at least two peaks, and a second microporous layer containing 8% or more by mass of the ultra-high-molecular-weight polyethylene.

5 Claims, 1 Drawing Sheet

(56) References Cited

U.S. PATENT DOCUMENTS

| | | |
|---|---|---|
| 2006/0141351 A1 | 6/2006 | Suh |
| 2007/0037047 A1* | 2/2007 | Ohashi et al. ............... 429/99 |
| 2009/0127733 A1* | 5/2009 | Takita et al. ............... 264/148 |
| 2009/0253032 A1 | 10/2009 | Takita et al. |
| 2009/0274955 A1* | 11/2009 | Kikuchi et al. ............... 429/144 |
| 2009/0286161 A1 | 11/2009 | Takita et al. |
| 2009/0305127 A1* | 12/2009 | Miller et al. ............... 429/163 |
| 2010/0021808 A1 | 1/2010 | Takita et al. |

FOREIGN PATENT DOCUMENTS

| | | | |
|---|---|---|---|
| JP | 06-240036 A | | 8/1994 |
| JP | 07-216118 A | | 8/1995 |
| JP | 2000-108249 A | | 4/2000 |
| JP | 2000-248093 A | | 9/2000 |
| JP | 2006-179485 A | | 7/2006 |
| WO | 00/20492 A1 | | 4/2000 |
| WO | 00/20493 A1 | | 4/2000 |
| WO | 00/49074 A1 | | 8/2000 |
| WO | 2004/089627 A1 | | 10/2004 |
| WO | WO 2004/089627 | * | 10/2004 |
| WO | 2005/113657 A1 | | 12/2005 |
| WO | WO 2006/062739 | * | 6/2006 |
| WO | WO 2007/010878 | * | 1/2007 |
| WO | WO 2007/046496 | * | 4/2007 |
| WO | 2007/117042 A1 | | 10/2007 |

* cited by examiner

Stretching

POLYOLEFIN COMPOSITION, ITS PRODUCTION METHOD, AND A BATTERY SEPARATOR MADE THEREFROM

CROSS REFERENCE TO RELATED APPLICATIONS

This application is a National Stage of International Application No. PCT/JP2007/065470 filed Aug. 1, 2007, claiming priority based on Japanese Patent Application No. 2006-210307 filed Aug. 1, 2006, the contents of all of which are incorporated herein by reference in their entirety.

FIELD OF THE INVENTION

The invention relates to a polyolefin composition. The polyolefin composition can be in the form of a polyolefin membrane having suitably well-balanced permeability, mechanical strength, heat shrinkage resistance, meltdown properties, electrolytic solution absorption, and compression resistance. The invention also relates to a method for producing such a polyolefin membrane, a battery separator formed by such polyolefin membrane, a battery comprising such a separator, and a method for using such a battery.

BACKGROUND OF THE INVENTION

Microporous polyolefin membranes are useful as separators for primary batteries and secondary batteries such as lithium ion secondary batteries, lithium-polymer secondary batteries, nickel-hydrogen secondary batteries, nickel-cadmium secondary batteries, nickel-zinc secondary batteries, silver-zinc secondary batteries, etc. When the microporous polyolefin membrane is used as a battery separator, particularly as a lithium ion battery separator, the membrane's performance significantly affects the properties, productivity and safety of the battery. Accordingly, the microporous polyolefin membrane should have suitably well-balanced permeability, mechanical properties, dimensional stability, shutdown properties, meltdown properties, etc. The term "well-balanced" means that the optimization of one of these characteristics does not result in a significant degradation in another. As is known, it is desirable for the batteries to have a relatively low shutdown temperature and a relatively high meltdown temperature for improved battery safety, particularly for batteries exposed to high temperatures under operating conditions. High separator permeability is desirable because it generally results in high battery capacity. A separator with high mechanical strength is desirable for improved battery assembly and fabrication, and for improved durability.

The optimization of material compositions, stretching conditions, heat treatment conditions, etc. has been proposed to improve the properties of microporous polyolefin membranes. For example, JP6-240036A discloses a microporous polyolefin membrane having improved pore diameter and a relatively sharp pore diameter distribution. The membrane is made from a polyethylene resin containing 1% or more by mass of ultra-high-molecular-weight polyethylene having a weight-average molecular weight ("Mw") of $7 \times 10^5$ or more, the polyethylene resin having a molecular weight distribution (weight-average molecular weight/number-average molecular weight) of 10 to 300, and the microporous polyolefin membrane having a porosity of 35 to 95%, an average penetrating pore size of 0.05 to 0.2 μm, a rupture strength (15-mm width) of 0.2 kg or more, and a pore size distribution (maximum pore size/average penetrating pore size) of 1.5 or less.

WO 2000/20492 discloses a microporous polyolefin membrane having improved permeability. The membrane contains fine fibrils made of polyethylene having Mw of $5 \times 10^5$ or more or a composition containing such polyethylene. The microporous polyolefin membrane has an average pore size of 0.05 to 5 μm, and the percentage of lamellas at angles θ of 80 to 100° relative to a membrane surface being 40% or more in machine and transverse cross sections.

In general, microporous polyolefin membranes consisting essentially of polyethylene (i.e., they contain polyethylene only with no significant presence of other species) have relatively low meltdown temperatures. Accordingly, proposals have been made to provide microporous polyolefin membranes made from mixed resins of polyethylene and polypropylene, and multi-layer, microporous polyolefin membranes having polyethylene layers and polypropylene layers in order to increase meltdown temperature.

WO 2005/113657 discloses a microporous polyolefin membrane having conventional shutdown properties, meltdown properties, dimensional stability and high-temperature strength. The membrane is made using a polyolefin composition comprising (a) a polyethylene resin containing 8 to 60% by mass of a component having a molecular weight of 10,000 or less, and a Mw/Mn ratio of 11 to 100, wherein Mn is the number-average molecular weight of the polyethylene resin, and a viscosity-average molecular weight ("Mv") of 100,000 to 1,000,000, and (b) polypropylene. The membrane has a porosity of 20 to 95%, and a heat shrinkage ratio of 10% or less at 100° C. This microporous polyolefin membrane is produced by extruding a melt-blend of the above polyolefin and a membrane-forming solvent through a die, stretching a gel-like sheet obtained by cooling, removing the membrane-forming solvent, and annealing the sheet.

WO 2004/089627 discloses a microporous polyolefin membrane made of polyethylene and polypropylene comprising two or more layers, the polypropylene content being more than 50% and 95% or less by mass in at least one surface layer, and the polyethylene content being 50 to 95% by mass in the entire membrane. The membrane has relatively high permeability and high-temperature strength, as well as a relatively low shutdown temperature and relatively high short-circuiting temperature.

JP7-216118A discloses a battery separator formed from a porous film comprising polyethylene and polypropylene as indispensable components and having two microporous layers each with a different polyethylene content. The polyethylene content is 0 to 20% by weight in one microporous layer, 21 to 60% by weight in the other microporous layer, and 2 to 40% by weight in the overall film. The battery separator has relatively high shutdown-starting temperature and mechanical strength.

With respect to the properties of separators, not only permeability, mechanical strength, dimensional stability, shutdown properties and meltdown properties, but also properties related to battery productivity characteristics such as electrolytic solution absorption, and battery cyclability characteristics such as compression resistance have been disclosed as important. In particular, electrodes for lithium ion batteries can expand and shrink according to the intrusion and departure of lithium, and an increase in battery capacity can lead to larger expansion ratios. Because separators are compressed when the electrodes expand, the separators are needed which suffer little, if any, decrease in electrolytic solution retention by compression. However, when the separators are provided with larger pore size to achieve improved electrolytic solution absorption, the compression resistance of the separators decrease. Battery separators disclosed in any of JP6-

240036A, WO 2000/20492, WO 05/113657, WO 04/089627 and JP7-216118A have insufficient electrolytic solution absorption and/or retention characteristics. Thus, microporous polyolefin membranes for battery separators are desired which have improved and well-balanced permeability, mechanical strength, heat shrinkage resistance, meltdown properties, electrolytic solution absorption, and compression resistance.

DISCLOSURE OF THE INVENTION

In an embodiment, the invention relates to the discovery of a multi-layer, microporous polyolefin membrane having improved permeability, mechanical strength, heat shrinkage resistance, meltdown properties, and electrolytic solution absorption, and compression resistance characteristics.

In another embodiment, the invention relates to method for producing such a multi-layer, microporous polyolefin membrane.

In another embodiment, the invention relates to a battery separator formed by such a multi-layer, microporous polyolefin membrane. In other embodiments, the invention relates to a battery comprising such a separator, and the use of such a battery. Accordingly, in an embodiment, the multi-layer, microporous polyolefin membrane comprises two microporous layers, wherein the first microporous layer comprises a first microporous layer material, and the second microporous layer comprises a second microporous layer material. The first and second microporous layer materials comprise polyethylene.

The first microporous layer material comprises one of
(a) high-density polyethylene ("HDPE") having a weight-average molecular weight of about $1 \times 10^4$ to about $5 \times 10^5$;
(b) ultra-high-molecular-weight polyethylene ("UHMWPE") having a weight-average molecular weight of $1 \times 10^6$ or more and HDPE, the amount of the UHMWPE being 7% or less by mass based on the combined mass of the UHMWPE and the HDPE;
(c) HDPE and polypropylene, the amount of polypropylene being 25% or less by mass based on the combined mass of the HDPE and the polypropylene; or
(d) polypropylene, UHMWPE, and HDPE, the amount of polypropylene being 25% or less by mass based on the combined mass of the UHMWPE, the HDPE, and the polypropylene and the amount of UHMWPE being 7% or less by mass based on the combined mass of the UHMWPE and the HDPE.

The second microporous layer material comprises one of:
(a) UHMWPE;
(b) UHMWPE and HDPE, the amount of the UHMWPE being at least 8% by mass based on the combined mass of the UHMWPE and the HDPE;
(c) HDPE and polypropylene, the amount of the polypropylene being 25% or less by mass based on the combined mass of the polypropylene and the HDPE; or
(d) UHMWPE, HDPE, and polypropylene, the amount of polypropylene being 25% or less by mass based on the mass of the combined mass of the HDPE, the UHMWPE, and the polypropylene, and the amount of the UHMWPE being at least about 8% by mass based on the combined mass of the UHMWPE and the HDPE.

Thus, in an embodiment, the invention relates to a two-layer microporous polyolefin membrane comprising:
(a) a first microporous layer material constituting a first microporous layer of the two-layer microporous polyolefin membrane, the first layer material comprising about 7% or less by mass of UHMWPE based on the total mass of polyethylene in the first microporous layer material, wherein the first layer material is characterized by a structure having a pore size distribution (e.g., as obtained using mercury intrusion porosimetry) having at least two peaks; and
(b) a second microporous layer material constituting a second microporous layer of the two-layer microporous polyolefin membrane, the second microporous layer material comprising at least about 8% by mass of UHMWPE based on the total mass of the polyethylene in the second microporous layer material.

In this embodiment, the first layer (which can also be called a first microporous layer) constitutes an outer surface of the membrane and the second layer (which can also be called a second microporous layer) constitutes a second outer surface of the membrane. For example, the first layer can be the top surface of the membrane and the second layer can be the bottom surface of the membrane (with the membrane oriented horizontally). Optionally, the first layer is in contact with the second layer. The term "in contact with" as used in this and the other embodiments means the first and second layer are in planar (i.e., not edge-wise) contact. In other words, the planar surface of the first layer, for example, has an interface with the planar surface of the second layer, with the interface located in the interior of the membrane.

In an embodiment, the multi-layer, microporous polyolefin membrane comprises three or more layers, wherein the first and third microporous layers constitute outer (or "skin") layers of the membrane and comprise the first microporous layer material. The second microporous layer constitutes a second microporous layer located between the first and third microporous layers. Optionally, the second microporous layer is in contact with at least one of the first and third microporous layers. The second microporous layer comprises the second microporous layer material. The first and second microporous layer materials can be the same as those described above for the two-layer membrane.

Thus, in an embodiment, the multi-layer, microporous polyolefin membrane of the present invention comprises at least three layers, wherein
(a) a first and a third microporous layer constitute at least both surface layers of the multi-layer, microporous polyolefin membrane, the first and the third microporous layers comprising a first polyethylene, wherein the polyethylene comprises 7% or less by mass of UHMWPE based on the mass of the polyethylene in the first microporous layer material, wherein the first layer material is characterized by a pore size distribution curve (e.g., as obtained using mercury intrusion porosimetry) having at least two peaks; and
(b) a second microporous layer constituting at least one second layer located between both the first and third layers, wherein the second microporous layer comprises a second microporous layer material comprising 8% or more by mass of UHMWPE based on the total mass of the polyethylene in the second microporous layers material.

Accordingly, the first and third layers of the multi-layer, microporous polyolefin membrane are microporous layers that comprise, or consist of, or consist essentially of the first microporous layer material. The second layer of the multi-layer, microporous polyolefin membrane is a microporous layer located between the first and third layers. In other words, the second layer constitutes an "intermediate" or "middle" or "interior" layer of the multi-layer, microporous polyolefin membrane. The second layer comprises, or consists of, or consists essentially of the second microporous layer material. In an embodiment, the multi-layer, microporous polyolefin membrane further comprises a plurality of intermediate layers, with at least one of the intermediate layers being the second layer, the other intermediate layers comprising the first layer material and/or second layer material. Optionally, the first microporous layer and third microporous layer (i.e., the layers which comprise the first layer material) have an average pore size in the range of about 0.02 µm to about 0.05 µm, and the second microporous layer has an average pore size of in the range of about 0.005 to about 0.1 µm. The term "pore size" is analogous to the "pore diameter" of approximately spherical pores. It should be understood that the pores of the multi-layer, microporous polyolefin membrane are not necessarily spherical, even though in embodiments of the invention the pores are approximated as spheres for the purpose of measuring, e.g., a pore size distribution.

In an embodiment, the first microporous layer material (and consequently, at least the first layer of the multi-layer, microporous polyolefin membrane) comprises dense domains having a main peak in the pore size distribution curve in a range of about 0.01 µm to about 0.08 µm and coarse domains having at least one sub-peak in a range of about 0.08 µm to about 1.5 µm. In another embodiment, the first microporous layer material comprises dense domains having a main peak in the pore size distribution curve in a range of about greater than 0.08 µm and less than 1.5 µm, in the pore size distribution curve. The ratio of the pore volume of the dense domains (calculated from the main peak) to the pore volume of the coarse domains (calculated from the sub-peak) is not critical, and can range, e.g., from about 0.5 to about 49. In an embodiment where the multi-layer microporous polyolefin membrane is a three-layer membrane, the thickness ratio expressed as the fraction first microporous layer/second microporous layer/third microporous layer can be, for example, about 1/(0.015 to 0.95)/1, where the first and third layers have a thickness normalized to 1.

The multi-layer, microporous polyolefin membranes have suitably well-balanced permeability, mechanical strength, heat shrinkage resistance, meltdown properties, electrolytic solution absorption, and compression resistance characteristics.

In an embodiment, the multi-layer, microporous polyolefin membrane has surface roughness of at least about $3 \times 10^2$ nm. With surface roughness within this range, the microporous polyolefin membrane has a relatively large contact area with an electrolytic solution when used as a battery separator, which can lead to relatively high electrolytic solution absorption.

In another embodiment, the invention relates to a first method for producing a multi-layer, microporous polyolefin membrane. The process involves producing a first polyolefin solution and a second polyolefin solution and then extruding the first and second polyolefin solutions through at least one die. The first polyolefin solution comprises a first membrane-forming solvent and a first polyolefin composition. The second polyolefin composition comprises a second membrane-forming solvent and a second polyolefin composition. The first and second polyolefin compositions contain polyethylene and are generally produced from one or more resins containing e.g., polyethylene, and optionally polypropylene and other species. Accordingly, in an embodiment the first polyolefin composition is produced by combining HDPE and UHMWPE resins, wherein the first polyolefin composition contains 7% or less by mass of UHMWPE based on the mass of the first polyethylene composition. The second polyethylene composition is produced by combining UHMWPE resin and optionally HDPE resin. The second polyolefin composition comprises at least 8% by mass of UHMWPE based on the mass of the second polyethylene composition. The UHMWPE resin and the HDPE resin used in the first polyolefin composition need not be the same as the UHMWPE resin and the HDPE resin used in the second polyolefin composition.

In an embodiment, the invention relates to a first method for producing the multi-layer, microporous polyolefin membrane comprises the steps of (1) combining (e.g., by melt-blending) a first polyolefin composition and a membrane-forming solvent to prepare a first polyolefin solution, (2) combining a second polyolefin composition and a second membrane-forming solvent to prepare a second polyolefin solution, (3) extruding (preferably simultaneously) the first and second polyolefin solutions through at least one die to form an extrudate, (4) cooling the extrudate to form a multi-layer, gel-like sheet, (5) removing the membrane-forming solvent from the multi-layer, gel-like sheet to form a solvent-removed gel-like sheet, and (6) drying the solvent-removed gel-like sheet in order to form the multi-layer, microporous polyolefin membrane. In step (3), wherein the extruding may comprise following steps of (a) at least a portion of the first polyolefin solution is extruded through a first die, (b) at least a portion of the second polyolefin solution is co-extruded through a second die, and (c) at least a portion of the first polyolefin solution is co-extruded through a third die, wherein the extrudate is a multi-layer extrudate which comprises a first layer and a third layer comprising the extruded first polyolefin solution, and a second layer comprising the extruded second polyolefin solution, with the second layer being located between the first and third layers. An optional stretching step (7), and an optional hot solvent treatment step (8), etc. can be conducted between steps (4) and (5), if desired. After step (6), an optional step (9) of stretching a multi-layer, microporous membrane, an optional heat treatment step (10), an optional cross-linking step with ionizing radiations (11), and an optional hydrophilic treatment step (12), etc., can be conducted if desired. The order of the optional steps is not critical.

In another embodiment, the invention relates to a second method for producing the multi-layer microporous polyolefin membrane. The second method for producing the multi-layer, microporous polyolefin membrane comprises the steps of (1) combining (e.g., by melt-blending) a first polyolefin composition and a first membrane-forming solvent to prepare a first polyolefin solution, (2) combining a second polyolefin composition and a second membrane-forming solvent to prepare a second polyolefin solution, (3) extruding the first polyolefin solution through a first die and the second solution through a second die and then laminating the extruded first and second polyolefin solutions to form a multi-layer extrudate, (4) cooling the multi-layer extrudate to form a multi-layer, gel-like sheet, (5) removing the membrane-forming solvent from the multi-layer, gel-like sheet to form a solvent-removed gel-like sheet, and (6) drying the solvent-removed gel-like sheet in order to form the multi-layer, microporous membrane. In step (3), wherein the extruding may comprise following steps of (a) at least a portion of the first polyolefin solution is extruded through the first die to make a first extrudate, (b) at least a portion of the second polyolefin solution is extruded through the second die to make a second extrudate, and (c) at least a portion of either the first or second polyolefin solution is extruded through a third die to make a third extrudate, and then laminating the first, second, and third extrudates to make a multi-layer extrudate which comprises a first layer and a third layer comprising the extruded first polyolefin solution, and a second layer comprising the extruded second polyolefin, with the second layer being located between the first and third layers. An optional stretching step (7), and an optional hot solvent treatment step (8), etc., can be conducted between steps (4) and (5), if desired. After step (6), an optional step (9) of stretching a multi-layer, microporous membrane, an optional heat treatment step (10), an optional cross-linking step with ionizing radiations (11), and an optional hydrophilic treatment step (12), etc., can be conducted.

In another embodiment, the invention relates to a third method for producing the multi-layer microporous polyolefin membrane. The third method for producing the multi-layer, microporous polyolefin membrane comprises the steps of (1) combining (e.g., by melt-blending) a first polyolefin composition and a membrane-forming solvent to prepare a first polyolefin solution, (2) combining a second polyolefin composition and a second membrane-forming solvent to prepare a second polyolefin solution, (3) extruding the first polyolefin solution through at least one first die to form at least one first extrudate, (4) extruding the second polyolefin solution through at least one second die to form at least one second extrudate, (5) cooling first and second extrudates to form at least one first gel-like sheet and at least one second gel-like sheet, (6) laminating the first and second gel-like sheet to form a multi-layer, gel-like sheet, (7) removing the membrane-forming solvent from the resultant multi-layer, gel-like sheet to form a solvent-removed gel-like sheet, and (8) drying the solvent-removed gel-like sheet in order to form the multi-layer, microporous membrane. The steps (3)-(6) may comprise following steps of (3) extruding at least a portion of the first polyolefin solution through a first and third die to make a first and third extrudate, (4) extruding at least a portion of the second polyolefin solution through a second die to make a second extrudate, (5) cooling first, second, and third extrudates to form first, second, and third gel-like sheets, and (6) laminating the first, second, and third gel-like sheets to form a multi-layer, gel-like sheet. An optional stretching step (9), and an optional hot solvent treatment step (10), etc., can be conducted between steps (5) and (6) or between steps (6) and (7), if desired. After step (8), an optional step (11) of stretching a multi-layer, microporous membrane, an optional heat treatment step (12), an optional cross-linking step with ionizing radiations (13), and an optional hydrophilic treatment step (14), etc, can be conducted.

The main difference between the third production method and the second production method is in the order of the steps for laminating and cooling. In the second production method, laminating the first and second polyolefin solutions is conducted before the cooling step. In the third production method, the first and second polyolefin solutions are cooled before the laminating step.

In another embodiment, the invention relates to a fourth method for producing the multi-layer microporous polyolefin membrane. The fourth method for producing the multi-layer, microporous polyolefin membrane comprises the steps of (1) combining (e.g., by melt-blending) a first polyolefin composition and a membrane-forming solvent to prepare a first polyolefin solution, (2) combining a second polyolefin composition and a second membrane-forming solvent to prepare a second polyolefin solution, (3) extruding the first polyolefin solution through at least one first die to form at least one first extrudate, (4) extruding the second polyolefin solution through at least one second die to form at least one second extrudate, (5) cooling first and second extrudates to form at least one first gel-like sheet and at least one second gel-like sheet, (6) removing the first and second membrane-forming solvents from the first and second gel-like sheets to form solvent-removed first and second gel-like sheets, (7) drying the solvent-removed first and second gel-like sheets to form at least one first polyolefin membrane and at least one second polyolefin membrane, and (8) laminating the first and second microporous polyolefin membranes in order to form the multi-layer, microporous polyolefin membrane.

The steps (3)-(8) may comprise following steps of (3) extruding at least a portion of the first polyolefin solution through a first and third die to make a first and third extrudate, (4) extruding at least a portion of the second polyolefin solution through a second die to make a second extrudate, (5) cooling first, second, and third extrudates to form first, second, and third gel-like sheets, (6) removing the first and second membrane-forming solvents from the first, second, and third gel-like sheets, (7) drying the solvent-removed first, second, and third gel-like sheets to form first, second, and third microporous polyolefin membranes, and (8) laminating the first, second, and third microporous polyolefin membranes in order to form the multi-layer, microporous polyolefin membrane. A stretching step (9), a hot solvent treatment step (10), etc., can be conducted between steps (5) and (6), if desired. A stretching step (11), a heat treatment step (12), etc., can be conducted between steps (7) and (8), if desired. After step (8), a step (13) of stretching a multi-layer, microporous membrane, a heat treatment step (14), a cross-linking step with ionizing radiations (15), a hydrophilic treatment step (16), etc., can be conducted if desired.

The following are preferred embodiments of the present invention:

(1) The method for making a multi-layer, microporous polyolefin membrane, wherein the first polyolefin solution does not contain ultra-high molecular weigh polyethylene.

(2) The method for making a multi-layer, microporous polyolefin membrane, wherein the second polyolefin composition comprises high density polyethylene and ultra-high molecular weight polyethylene.

(3) The method for making a multi-layer, microporous polyolefin membrane, wherein the first and second polypropylenes are independently selected from polypropylene having a molecular weight ranging from about $1\times10^4$ to about $4\times10^6$.

(4) The method for making a multi-layer, microporous polyolefin membrane, wherein the first membrane-forming solvent comprises one or more of (i) aliphatic, alicyclic or aromatic hydrocarbons; (ii) mineral oil distillates having boiling points comparable to the aliphatic, alicyclic or aromatic hydrocarbons; (iii) stearyl alcohol, (iv) ceryl alcohol, and (v) paraffin waxes.

(5) The method for making a multi-layer, microporous polyolefin membrane, wherein the second membrane-forming solvent comprises one or more of (i) aliphatic, alicyclic or aromatic hydrocarbons; (ii) mineral oil distillates having boiling points comparable to the aliphatic, alicyclic or aromatic hydrocarbons; (iii) stearyl alcohol, (iv) ceryl alcohol, and (v) paraffin waxes.

The battery separator according to the present invention, which is made by the multi-layer, microporous polyolefin membrane described above.

The battery according to the present invention, which is made by the separator described above. The battery may contain an anode, a cathode, and at least one separator comprising the multi-layer, microporous polyolefin membrane located between the anode and the cathode. The battery may be a secondary battery. The battery may be a lithium-ion secondary battery.

In yet another embodiment, the invention relates to a method for using the battery as a source or sink of electric charge.

DETAILED DESCRIPTION OF THE INVENTION

Figure 1:
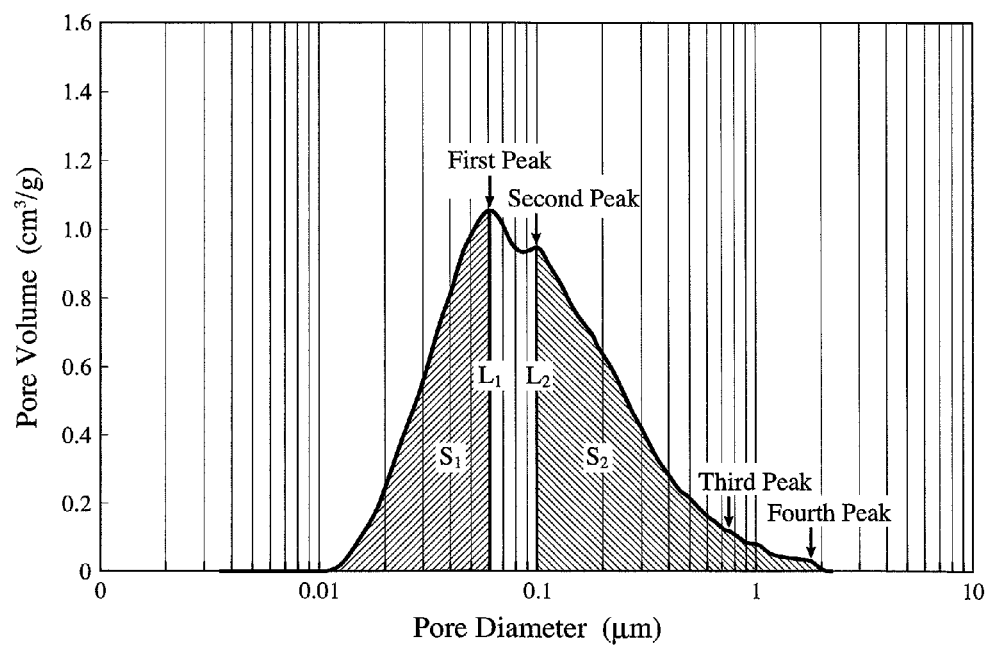
FIG. 1 is a graph showing a typical pore size distribution curve.

[1] Compostion Of The Multi-Layer Microporous Polyolefin Membrane

In an embodiment, the multi-layer, microporous polyolefin membrane comprises two layers. The first layer (e.g., the top or upper layer of the membrane) comprises a first microporous layer material, and the second layer (e.g., the bottom or lower layer of the membrane) comprises a second microporous layer material. For example, the membrane can have a planar top layer when viewed from above on an axis approximately perpendicular to the transverse and machine (longitudinal) directions of the membrane, with the bottom planar layer hidden from view by the top layer. In another embodiment, the multi-layer, microporous polyolefin membrane comprises three or more layers, wherein the outer layers (also called the "surface" or "skin" layers) comprise the first microporous layer material and at least one intermediate layer comprises the second microporous layer material. In a related embodiment, where the multi-layer, microporous polyolefin membrane comprises two layers, the first layer consists essentially of (or consists of) the first microporous layer material and the second layer consists essentially of (or consists of) the second microporous layer material. In a related embodiment where the multi-layer, microporous polyolefin membrane comprises three or more layers, the outer layers consist essentially of (or consist of) the first microporous layer material and at least one intermediate layer consists essentially of (or consists of) the second microporous layer material.

The first and second microporous layer materials contain polyethylene. The first and second microporous layer materials will now be described in more detail.

A. The First Microporous Layer Material

In an embodiment, the first microporous layer material comprises one of:

(i) a first polyethylene having an Mw that is less than $1\times10^6$;
(ii) the first polyethylene and a second polyethylene having a Mw of at least about $1\times10^6$, wherein the second polyethylene is present in an amount that does not exceed about 7% or by mass based on the combined mass of the first and second polyethylene;
(iii) the first polyethylene and a first polypropylene, wherein the amount of the polypropylene ranges does not exceed about 25% by mass based on the combined mass of the first polyethylene and the first polypropylene; or
(iv) the first polyethylene, the second polyethylene, and the first polypropylene, wherein the first polypropylene is present in an amount that does not exceed about 25% by mass based on the combined mass of the first polyethylene, the second polyethylene, and the first polypropylene, and wherein the second polyethylene is present in an amount that does not exceed about 7% by mass based on the combined mass of the first and second polyethylene.

In an embodiment, the first microporous layer material (and consequently, the first layer of the two-layer, microporous polyolefin membrane and the first and third layers of a three-layer microporous polyolefin membrane) is characterized by a pore size distribution exhibiting relatively dense domains having a main peak in a range of 0.01 µm to 0.08 µm and relatively coarse domains exhibiting at least one sub-peak in a range of more than 0.08 µm to 1.5 µm or less in the pore size distribution curve. The ratio of the pore volume of the dense domains (calculated from the main peak) to the pore volume of the coarse domains (calculated from the sub-peak) is not critical, and can range, e.g., from about 0.5 to about 49. Generally, the dense domains and coarse domains are irregularly entangled to form a hybrid structure in any cross sections of the first microporous layer as viewed in machine and transverse directions.

The first microporous layer material can contain the second polyethylene. Provided it does not exceed 7% by mass based on the mass of the first microporous layer material, the amount of the second polyethylene in the first microporous layer material in not critical. When the amount of the second polyethylene (when present) in the first microporous layer material is more than 7% by mass, it can be more difficult to produce a first microporous layer material exhibiting a hybrid structure.

The Mw of the polyolefin in the first microporous layer material is not critical, and can be e.g., about $1\times10^6$ or less. In an embodiment, the Mw of the polyolefin in the first microporous layer material ranges from about $1\times10^5$ to about $1\times10^6$, or from about $2\times10^5$ to about $1\times10^6$. When the Mw of the polyolefin in the first layer material is more than $1\times10^6$, it can be more difficult to produce a first microporous layer material exhibiting a hybrid structure. When the Mw of the polyolefin in the first layer material is less than $1\times10^5$, it is more difficult to produce a multi-layer, microporous polyolefin membrane that does not break or tear during stretching.

When the first layer material contains polypropylene, the amount of polypropylene can be, e.g., about 25% or less by mass, or in a rage of about 2% to about 15% by mass, or in a rage of about 3% to about 10% by mass, based on 100% by mass of the first microporous layer material.

B. The Second Microporous Layer Material

In an embodiment, the second microporous layer material comprises one of:

(i) a fourth polyethylene having an Mw of at least about $1\times10^6$;
(ii) a third polyethylene having an Mw that is less than $1\times10^6$ and the fourth polyethylene, wherein the fourth polyethylene is present in an amount of at least about 8% by mass based on the combined mass of the third and fourth polyethylene;
(iii) the fourth polyethylene and a second polypropylene wherein the second polypropylene is present in an amount that does not exceed about 25% by mass based on the combined mass of the fourth polyethylene and the second polypropylene; or
(iv) the third polyethylene, the fourth polyethylene, and the second polypropylene, wherein second polypropylene is present in an amount that does not exceed about 25% by mass based on the combined mass of the third polyethylene, the fourth polyethylene, and the second polypropylene, and the fourth polyethylene is present in an amount of at least about 8% by mass based on the combined mass of the third and fourth polyethylene.

In an embodiment, the amount of the second polyethylene in the second microporous layer material is at least about 8% by mass, based on 100% by mass of the total amount of polyethylene in the second microporous layer material. When this amount is less than 8% by mass, it can be more difficult to produce a relatively strong multi-layer, microporous polyolefin membrane. This amount is not critical (provided it is at least about 8%), and can be, e.g., at least 20% by mass, or at least about 25% by mass.

In an embodiment where the second microporous layer material comprises polyethylene and polypropylene, the amount of polypropylene can be, e.g., about 25% or less by mass based on 100% by mass of the second microporous layer material. When this amount is more than 25% by mass, it is more difficult to produce a relatively strong multi-layer, microporous polyolefin membrane. Optionally, the amount of polypropylene in the second microporous layer material ranges, e.g., from about 2% to about 15% by mass, or from about 3% to about 10% by mass.

C. The First Polyethylene

In an embodiment, the first polyethylene is a polyethylene having an Mw ranging from about $1\times10^4$ to about $5\times10^5$. For example, the first polyethylene can be one or more of a high-density polyethylene, a medium-density polyethylene, a branched low-density polyethylene, or a linear low-density polyethylene. Although it is not critical, the Mw of high-density polyethylene can range, for example, from about $1\times10^5$ to about $5\times10^5$, or from about $2\times10^5$ to about $4\times10^5$. In an embodiment, the first polyethylene is at least one of (i) an ethylene homopolymer or (ii) a copolymer of ethylene and a third $\alpha$-olefin such as propylene, butene-1, hexene-1, etc, typically in a relatively small amount compared to the amount of ethylene. Such a copolymer can be produced using a single-site catalyst.

D. The Second Polyethylene

The second polyethylene is a polyethylene having an Mw of at least about $1\times10^6$. In an embodiment, the second polyethylene is at least one of (i) an ethylene homopolymer or (ii) a copolymer of ethylene and a fourth $\alpha$-olefin which is typically present in a relatively small amount compared to the amount of ethylene. The fourth $\alpha$-olefin can be, for example, one or more of propylene, butene-1, pentene-1, hexene-1, 4-methylpentene-1, octene-1, vinyl acetate, methyl methacrylate, or styrene. Although it is not critical, the Mw of the second polyethylene can range from about $1\times10^6$ to about $15\times10^6$, or from about $1\times10^6$ to about $5\times10^6$, or from about $1\times10^6$ to about $3\times10^6$.

E. The Third Polyethylene

In an embodiment, the third polyethylene is a polyethylene having an Mw ranging from about $1\times10^4$ to about $5\times10^5$. For example, the third polyethylene can be one or more of a high-density polyethylene, a medium-density polyethylene, a branched low-density polyethylene, or a linear low-density polyethylene. Although it is not critical, the Mw of high-density polyethylene can range, for example, from about $1\times10^5$ to about $5\times10^5$, or from about $2\times10^5$ to about $4\times10^5$. In an embodiment, the third polyethylene is at least one of (i) an ethylene homopolymer or (ii) a copolymer of ethylene and a third $\alpha$-olefin such as propylene, butene-1, hexene-1, etc, typically in a relatively small amount compared to the amount of ethylene. Such a copolymer can be produced using a single-site catalyst. The third polyethylene can be the same as the first polyethylene, but this is not required.

F. The Fourth Polyethylene

The fourth polyethylene is a polyethylene having an Mw of at least about $1\times10^6$. In an embodiment, the fourth polyethylene is at least one of (i) an ethylene homopolymer or (ii) a copolymer of ethylene and a fourth $\alpha$-olefin which is typically present in a relatively small amount compared to the amount of ethylene. The fourth $\alpha$-olefin can be, for example, one or more of propylene, butene-1, pentene-1, hexene-1, 4-methylpentene-1, octene-1, vinyl acetate, methyl methacrylate, or styrene. Although it is not critical, the Mw of the fourth polyethylene can range from about $1\times10^6$ to about $15\times10^6$, or from about $1\times10^6$ to about $5\times10^6$, or from about $1\times10^6$ to about $3\times10^6$ The fourth polyethylene can be the same as the second polyethylene, but this is not required G. The First Polypropylene The first microporous layer materials can optionally comprise a first polypropylene. The polypropylene can be, for example, one or more of (i) a propylene homopolymer or (ii) a copolymer of propylene and a fifth olefin. The copolymer can be a random or block copolymer. The fifth olefin can be, e.g., one or more of $\alpha$-olefins such as ethylene, butene-1, pentene-1, hexene-1, 4-methylpentene-1, octene-1, vinyl acetate, methyl methacrylate, and styrene, etc.; and diolefins such as butadiene, 1,5-hexadiene, 1,7-octadiene, 1,9-decadiene, etc. The amount of the fifth olefin in the copolymer is preferably in a range that does not adversely affect properties of the multi-layer microporous membrane such as heat resistance, compression resistance, heat shrinkage resistance, etc. For example, the amount of the fifth olefin can be less than 10% by mol based on 100% by mol of the entire copolymer.

H. The Second Polypropylene

The second microporous layer materials can optionally comprise a second polypropylene. The polypropylene can be, for example, one or more of (i) a propylene homopolymer or (ii) a copolymer of propylene and a fifth olefin. The copolymer can be a random or block copolymer. The fifth olefin can be, e.g., one or more of $\alpha$-olefins such as ethylene, butene-1, pentene-1, hexene-1, 4-methylpentene-1, octene-1, vinyl acetate, methyl methacrylate, and styrene, etc.; and diolefins such as butadiene, 1,5-hexadiene, 1,7-octadiene, 1,9-decadiene, etc. The amount of the fifth olefin in the copolymer is preferably in a range that does not adversely affect properties of the multi-layer microporous membrane such as heat resistance, compression resistance, heat shrinkage resistance, etc. For example, the amount of the fifth olefin can be less than 10% by mol based on 100% by mol of the entire copolymer. The second polypropylene can be the same as the first polyethylene, but this is not required.

I. Seventh Polyolefin

In addition to the first, second, third, and fourth polyethylenes and the first and second polypropylenes, each of the first and second layer materials can optionally contain one or more additional polyolefins, identified as the seventh polyolefin, which can be, e.g., one or more of polybutene-1, polypentene-1, poly-4-methylpentene-1, polyhexene-1, polyoctene-1, polyvinyl acetate, polymethyl methacrylate, polystyrene and an ethylene $\alpha$-olefin copolymer (except for an ethylene-propylene copolymer). In an embodiment where a seventh polyolefin is present, the seventh polyolefin can, for example, have an Mw in the range of about $1\times10^4$ to about $4\times10^6$. In addition to or besides the seventh polyolefin, the first and second microporous layer materials can further comprise a polyethylene wax, e.g., one having an Mw in the range of about $1\times10^3$ to about $1\times10^4$. When used, these species should be present in amounts less than an amount that would cause deterioration in the desired properties (e.g., meltdown, shutdown, etc.) of the multi-layer, microporous membrane. When the seventh polyolefin is one or more of polybutene-1, polypentene-1, poly-4-methylpentene-1, polyhexene-1, polyoctene-1, polyvinyl acetate, polymethyl methacrylate, and polystyrene, the seventh polyolefin need not be a homopolymer, but may be a copolymer containing other $\alpha$-olefins.

[2] Compostion Of Materials Used To Produce The Multi-Layer, Microporous Polyolefin Membrane In an embodiment, the first microporous layer material is produced from a first polyolefin solution. The first polyolefin solution comprises a first polyolefin composition and a first membrane-forming solvent. The first polyolefin composition is produced from a first resin or resins. Similarly, the second polyolefin solution comprises a second polyolefin composition and a second membrane-forming solvent. The second polyolefin composition is produced from a second resin or resins. These will now be described in more detail.

A. First Polyolefin Composition

The first polyolefin composition is produced from at least one polyethylene, e.g., in the form of one or more polyethylene resins. In an embodiment, the first polyolefin composition can be made from a first resin, which can a mixture of resins. For example, the first polyolefin composition is made from a first resin, where the first resin comprises resins of polyethylene only, or resins of polyethylene and polypropylene. The first polyolefin composition can be made by conventional methods, e.g., by dry mixing or melt blending the resin(s).

1. First Resin

The first resin can be a mixture of resins. In an embodiment the first resin is selected from resins of the following:
  (a) a first polyethylene having an Mw that is less than $1 \times 10^6$;
  (b) the first polyethylene and a second polyethylene having a Mw of at least about $1 \times 10^6$, wherein the second polyethylene is present in an amount that does not exceed about 7% by mass based on the combined mass of the first and second polyethylene;
  (c) the first polyethylene and a first polypropylene, wherein the amount of the polypropylene ranges does not exceed about 25% by mass based on the combined mass of the first polyethylene and the first polypropylene; or
  (d) the first polyethylene, the second polyethylene, and the first polypropylene, wherein the first polypropylene is present in an amount that does not exceed about 25% by mass based on the combined mass of the first polyethylene, the second polyethylene, and the first polypropylene, and wherein the second polyethylene is present in an amount that does not exceed about 7% by mass based on the combined mass of the first and second polyethylene.

In an embodiment, the first resin contains polyethylene only. In other words, in an embodiment, the first resin consists essentially of polyethylene or consists of polyethylene.

(1) Polyethylene Resins Used to Make the First Polyolefin Composition

In an embodiment, the first and second polyethylenes in the first resin are generally the same as the first and second polyethylenes described above in section [1]. The second polyethylene is present in the first resin in an amount that does not exceed about 7% based on the total amount of polyethylene in the first resin. When the amount the second polyethylene in the first resin is more than 7% by mass, it can be more difficult to produce a multi-layer microporous polyolefin membrane exhibiting a hybrid structure in the first microporous layer material. The amount of the second polyethylene is preferably 5% or less by mass, or 3% or less by mass. The remainder of the first resin can be, e.g., resins of the first polyethylene and/or first polypropylene.

The Mw of the polyethylene in first resin is not critical, and can range, e.g., from about $1 \times 10^6$ or less, or from about $1 \times 10^5$ to about $1 \times 10^6$, or about $2 \times 10^5$ to about $1 \times 10^6$. When the Mw of the polyethylene in the first polyolefin composition is more than about $1 \times 10^6$, it can be more difficult to produce a multi-layer microporous polyolefin membrane having a first layer material characterized by a hybrid structure. When the Mw of the first polyethylene composition is less than about $1 \times 10^5$, it can be more difficult to produce a multi-layer microporous polyolefin membrane that can be stretched without breaking or tearing.

(2) Polypropylene Resins Used to Make the First Polyolefin Composition

When the first polyolefin composition is produced from resins of polyethylene and resins of polypropylene, the amount of polypropylene in the first polyolefin composition generally does not exceed about 25% by mass based on 100% of the mass of the first polyolefin composition. When the amount of polypropylene exceeds about 25% by mass, it can be more difficult to produce a multi-layer, microporous polyolefin membrane of sufficient mechanical strength. The amount of polypropylene in the first polyolefin composition can be, e.g., about 15% or less by mass, or about 10% or less by mass.

The type of the polypropylene in the first resin is not critical, and can be a propylene homopolymer or a copolymer of propylene and a third α-olefin and/or diolefin, or a mixture thereof. For example, in one embodiment, the polypropylene is a homopolymer. When the polypropylene is a copolymer, the copolymer can be a random or block copolymer. The third olefin is not propylene, and can be, e.g., one or more of ethylene, butene-1, pentene-1, hexene-1, 4-methylpentene-1, octene-1, vinyl acetate, methyl methacrylate, styrene, etc., and diolefins such as butadiene, 1,5-hexadiene, 1,7-octadiene, 1,9-decadiene, etc. The amount of the third olefin is not critical, and can be any amount that does not cause a deterioration in a desirable property of polypropylene such as heat resistance, compression resistance, heat shrinkage resistance. In an embodiment, the amount of the third olefin is less than 10% by mol based on 100% by mol of the polypropylene copolymer.

The Mw of the polypropylene is not critical. In an embodiment, the Mw ranges from about $1 \times 10^4$ to about $4 \times 10^6$, or about $3 \times 10^5$ to about $3 \times 10^6$. The molecular weight distribution (Mw/Mn) of polypropylene is not critical, and can range e.g., from about 1.01 to about 100, or about 1.1 to about 50.

B. Second Polyolefin Composition

The second polyolefin composition is produced from at least one polyethylene, e.g., in the form of one or more polyethylene resins. In an embodiment, the second polyolefin composition can be made from a second resin or mixture of resins. For example, the second polyolefin composition is made from a second resin, where the second resin comprises resins of polyethylene only, or resins of polyethylene and polypropylene. The second polyolefin composition can be made by conventional methods, e.g., by dry mixing or melt blending the resin(s).

1. Second Resin

Like the first resin, the second resin can be a mixture of resins. In an embodiment the second resin is selected from resins of the following:
  (a) a fourth polyethylene having an Mw of at least about $1 \times 10^6$;
  (b) a third polyethylene having an Mw that is less than $1 \times 10^6$ and the fourth polyethylene, wherein the fourth polyethylene is present in an amount of at least about 8% by mass based on the combined mass of the third and fourth polyethylene;
  (c) the fourth polyethylene and a second polypropylene wherein the second polypropylene is present in an amount that does not exceed about 25% by mass based on the combined mass of the fourth polyethylene and the second polypropylene; or
  (d) the third polyethylene, the fourth polyethylene, and the second polypropylene, wherein second polypropylene is present in an amount that does not exceed about 25% by mass based on the combined mass of the third polyethylene, the fourth polyethylene, and the second polypropylene, and the fourth polyethylene is present in an amount of at least about 8% by mass based on the combined mass of the third and fourth polyethylene.

In an embodiment, the second resin contains polyethylene only. In other words, in an embodiment, the second resin consists essentially of polyethylene or consists of polyethylene.

(1) Polyethylene Resins Used to Make the Second Polyolefin Composition

In an embodiment, the third and fourth polyethylenes in the second resin are generally the same as the first and second polyethylenes described above in section [1]. When the amount of the fourth polyethylene in the second resin is less than about 8% by mass based on the mass of the second resin, it can be more difficult to produce a relatively strong multi-layer microporous polyolefin membrane. In an embodiment, the amount of the fourth polyethylene is, e.g., at least about 20% by mass, or at least about 25% by mass based on the mass of the second resin.

In an embodiment, the second resin contains polyethylene only. In other words, in an embodiment, the second resin consists essentially of polyethylene or consists of polyethylene.

(2) Polypropylene Resins Used to Make the Second Polyolefin Composition

When the second polyolefin composition is produced from resins of polyethylene and resins of polypropylene, the amount of polypropylene in the second polyolefin composition generally does not exceed about 25% by mass based on 100% of the mass of the second polyolefin composition. When the amount of polypropylene exceeds about 25% by mass, it can be more difficult to produce a multi-layer, microporous polyolefin membrane of sufficient mechanical strength. The amount of polypropylene in the second polyolefin composition can be, e.g., about 15% or less by mass, or about 10% or less by mass.

The type of the polypropylene in the second resin is not critical, and can be a propylene homopolymer or a copolymer of propylene and a third α-olefin and/or diolefin, or a mixture thereof For example, in one embodiment, the polypropylene is a homopolymer. When the polypropylene is a copolymer, the copolymer can be a random or block copolymer. The third olefin is not propylene, and can be, e.g., one or more of ethylene, butene-1, pentene-1, hexene-1, 4-methylpentene-1, octene-1, vinyl acetate, methyl methacrylate, styrene, etc., and diolefins such as butadiene, 1,5-hexadiene, 1,7-octadiene, 1,9-decadiene, etc. The amount of the third olefin is not critical, and can be any amount that does not cause a deterioration in a desirable property of polypropylene such as heat resistance, compression resistance, heat shrinkage resistance. In an embodiment, the amount of the third olefin is less than 10% by mol based on 100% by mol of the polypropylene copolymer.

The Mw of the polypropylene is not critical. In an embodiment, the Mw ranges from about $1\times10^4$ to about $4\times10^6$, or about $3\times10^5$ to about $3\times10^6$. The molecular weight distribution (Mw/Mn) of polypropylene is not critical, and can range e.g., from about 1.01 to about 100, or about 1.1 to about 50.

C. Molecular Weight Distributions (Mw/Mn) of the Polyethylene in the First and Second Polyolefin Compositions Mw/Mn is a measure of a molecular weight distribution; the larger this value, the wider the molecular weight distribution. The molecular weight distribution of the first polyolefin composition need not be the same as the molecular weight distribution of the second polyolefin composition. Though not critical, Mw/Mn of the polyethylene in the first polyolefin composition, the second polyolefin composition, or both can range, e.g., from about 5 to about 300, or from about 5 to about 100, or about 5 to about 30. When the Mw/Mn is less than about 5, it can be more difficult to extrude the polyolefin solution. On the other hand, when the Mw/Mn is more than 300, it can be more difficult to produce a multi-layer, microporous polyolefin membrane of sufficient strength. The Mw/Mn of polyethylene (homopolymer or an ethylene α-olefin copolymer) can be controlled by conventional methods, e.g., a multi-stage polymerization. The multi-stage polymerization method can be a two-stage polymerization method comprising forming a relatively high molecular-weight polymer component in the first stage, and forming a relatively low molecular-weight polymer component in the second stage. In the case where the first and/or second polyolefin compositions contain the first and second polyethylene, the larger the Mw/Mn, the larger difference in Mw exists between the first polyethylene and the second polyethylene, and vice versa. In this case, the Mw/Mn of the polyethylene composition can be controlled, e.g., by controlling the relative molecular weights and mixing ratios of the first and second polyethylene.

D. Other Components

In addition to the above components, the first and second polyolefin composition can contain the other polyolefins besides the first through fourth polyethylenes and the first and second polypropylene,. For example, the first and second polyolefin compositions can contain other polyolefins and/or heat-resistant polymers having melting points or glass transition temperatures (Tg) of 170° C. or higher. The amount of such species in the polyolefin composition is not critical and can be, e.g., any amount that does not significantly deteriorate the desired properties of the microporous polyolefin membrane.

(1) Other Polyolefins

The other polyolefins can be one or more of (a) polybutene-1, polypentene-1, poly-4-methylpentene-1, polyhexene-1, polyoctene-1, polyvinyl acetate, polymethyl methacrylate, polystyrene and an ethylene α-olefin copolymer, each of which may have Mw of $1\times10^4$ to $4\times10^6$, and/or (b) a polyethylene wax having Mw of $1\times10^3$ to $1\times10^4$. Polybutene-1, polypentene-1, poly-4-methylpentene-1, polyhexene-1, polyoctene-1, polyvinyl acetate, polymethyl methacrylate and polystyrene are not restricted to homopolymers, but can be copolymers containing other α-olefins.

(2) Heat-Resistant Resins

The type of heat-resistant resin, when one is used, is not critical. The heat-resistant resins can be, e.g., crystalline resins having melting points of 170° C. or higher, which may be partially crystalline, and amorphous resins having Tg of 170° C. or higher. The melting point and Tg can be determined by, e.g., differential scanning calorimetry (DSC) according to JIS K7121. Specific examples of the heat-resistant resins include polyesters such as polybutylene terephthalate (melting point: about 160 to 230° C.), polyethylene terephthalate (melting point: about 250 to 270° C.), etc., fluororesins, polyamides (melting point: 215 to 265° C.), polyarylene sulfide, polyimides (Tg: 280° C. or higher), polyamideimides (Tg: 280° C.), polyether sulfone (Tg: 223° C.), polyetheretherketone (melting point: 334° C.), polycarbonates (melting point: 220 to 240° C.), cellulose acetate (melting point: 220° C.), cellulose triacetate (melting point: 300° C.), polysulfone (Tg: 190° C.), polyetherimide (melting point: 216° C.), etc.

The multi-layer microporous membrane generally comprises the materials used to form the first and second polyolefin compositions. A small amount of washing solvent and/or membrane-forming solvent can also be present in the membrane, generally in amounts less than 1 wt % based on the weight of the microporous polyolefin membrane. A small amount of molecular weight degradation might occur during processing of the polyolefins, but this is acceptable. In an embodiment, molecular weight degradation during processing, if any, causes the value of Mw/Mn of the polyolefin in the first or second layer material to differ from the Mw/Mn of the first or second polyolefin compositions by no more than about 10%, or no more than about 1%, or no more than about 0.1%.

[3] Production Method Of Multi-Layer, Microporous Polyolefin Membrane

In an embodiment, the microporous polyolefin membrane is a two-layer membrane. In another embodiment, the microporous polyolefin membrane has at least three layers. For the sake of brevity, the production of the microporous polyolefin membrane will be mainly described in terms of two-layer and three-layer membrane, although those skilled in the art will recognize that the same techniques can be applied to the production of membranes or membranes having at least four layers.

In an embodiment, the three-layer microporous polyolefin membrane comprises first and third microporous layers constituting the outer layers of the microporous polyolefin membrane and a second layer situated between (and optionally in planar contact with) the first and third layers. In an embodiment, the first and third layers are produced from the first polyolefin solution and the second (or inner) layer is produced from the second polyolefin solution.

A. First Production Method

The first method for producing the multi-layer, microporous polyolefin membrane comprises the steps of (1) combining (e.g., by melt-blending) a first polyolefin composition and a membrane-forming solvent to prepare a first polyolefin solution, (2) combining a second polyolefin composition and a second membrane-forming solvent to prepare a second polyolefin solution, (3) extruding (preferably simultaneously) the first and second polyolefin solutions through at least one die to form an extrudate, (4) cooling the extrudate to form a multi-layer, gel-like sheet, (5) removing the membrane-forming solvent from the multi-layer, gel-like sheet to form a solvent-removed gel-like sheet, and (6) drying the solvent-removed gel-like sheet in order to form the multi-layer, microporous polyolefin membrane. An optional stretching step (7), and an optional hot solvent treatment step (8), etc. can be conducted between steps (4) and (5), if desired. After step (6), an optional step (9) of stretching a multi-layer, microporous membrane, an optional heat treatment step (10), an optional cross-linking step with ionizing radiations (11), and an optional hydrophilic treatment step (12), etc., can be conducted if desired. The order of the optional steps is not critical.

Step (1) Preparation of First Polyolefin Solution

The first polyolefin composition comprises polyolefin resins as described above that can be combined, e.g., by dry mixing or melt blending with an appropriate membrane-forming solvent to produce the first polyolefin solution. Optionally, the first polyolefin solution can contain various additives such as one or more antioxidant, fine silicate powder (pore-forming material), etc., provided these are used in a concentration range that does not significantly degrade the desired properties of the multi-layer, microporous polyolefin membrane.

The first membrane-forming solvent is preferably a solvent that is liquid at room temperature. While not wishing to be bound by any theory or model, it is believed that the use of a liquid solvent to form the first polyolefin solution makes it possible to conduct stretching of the gel-like sheet at a relatively high stretching magnification. In an embodiment, the first membrane-forming solvent can be at least one of aliphatic, alicyclic or aromatic hydrocarbons such as nonane, decane, decalin, p-xylene, undecane, dodecane, liquid paraffin, etc.; mineral oil distillates having boiling points comparable to those of the above hydrocarbons; and phthalates liquid at room temperature such as dibutyl phthalate, dioctyl phthalate, etc. In an embodiment where it is desired to obtain a multi-layer, gel-like sheet having a stable liquid solvent content, non-volatile liquid solvents such as liquid paraffin can be used, either alone or in combination with other solvents. Optionally, a solvent which is miscible with polyethylene in a melt blended state but solid at room temperature can be used, either alone or in combination with a liquid solvent. Such solid solvent can include, e.g., stearyl alcohol, ceryl alcohol, paraffin waxes, etc. Although it is not critical, it can be more difficult to evenly stretch the gel-like sheet or resulting membrane when the solution contains no liquid solvent.

The viscosity of the liquid solvent is not a critical parameter. For example, the viscosity of the liquid solvent can range from about 30 cSt to about 500 cSt, or from about 30 cSt to about 200 cSt, at 25° C. Although it is not a critical parameter, when the viscosity at 25° C. is less than about 30 cSt, it can be more difficult to prevent foaming the polyolefin solution, which can lead to difficulty in blending. On the other hand, when the viscosity is greater than about 500 cSt, it can be more difficult to remove the liquid solvent from the multi-layer microporous polyolefin membrane.

In an embodiment, the resins, etc., used to produce to the first polyolefin composition are melt-blended in, e.g., a double screw extruder or mixer. For example, a conventional extruder (or mixer or mixer-extruder) such as a double-screw extruder can be used to combine the resins, etc., to form the first polyolefin composition. The membrane-forming solvent can be added to the polyolefin composition (or alternatively to the resins used to produce the polyolefin composition) at any convenient point in the process. For example, in an embodiment where the first polyolefin composition and the first membrane-forming solvent are melt-blended, the solvent can be added to the polyolefin composition (or its components) at any of (i) before starting melt-blending, (ii) during melt blending of the first polyolefin composition, or (iii) after melt-blending, e.g., by supplying the first membrane-forming solvent to the melt-blended or partially melt-blended polyolefin composition in a second extruder or extruder zone located downstream of the extruder zone used to melt-blend the polyolefin composition.

When melt-blending is used, the melt-blending temperature is not critical. For example, the melt-blending temperature of the first polyolefin solution can range from about 10° C. higher than the melting point $Tm_1$ of the polyethylene in the first resin to about 120° C. higher than $Tm_1$. For brevity, such a range can be represented as $Tm_1+10°$ C. to $Tm_1+120°$ C. In an embodiment where the polyethylene in the first resin has a melting point of about 130° C. to about 140° C., the melt-blending temperature can range from about 140° C. to about 250° C., or from about 170° C. to about 240° C.

When an extruder such as a double-screw extruder is used for melt-blending, the screw parameters are not critical. For example, the screw can be characterized by a ratio L/D of the screw length L to the screw diameter D in the double-screw extruder, which can range, for example, from about 20 to about 100, or from about 35 to about 70. Although this parameter is not critical, when L/D is less than about 20, melt-blending can be more difficult, and when L/D is more than about 100, faster extruder speeds might be needed to prevent excessive residence time of the polyolefin solution in the double-screw extruder (which can lead to undesirable molecular weight degradation). Although it is not a critical parameter, the cylinder (or bore) of the double-screw extruder can have an inner diameter of in the range of about 40 mm to about 100 mm, for example.

The amount of the first polyolefin composition in the first polyolefin solution is not critical. In an embodiment, the amount of first polyolefin composition in the first polyolefin solution can range from about 1 wt. % to about 75 wt. %, based on the weight of the polyolefin solution, for example from about 20 wt. % to about 70 wt. %.

When a hybrid structure is desired in the first microporous layer material, when the amount of first polyolefin composition in the first polyolefin solution ranges from about 25 wt.% to about 50 wt.%, it is less difficult to form a hybrid structure in the first microporous layer material. Optionally, the amount of first polyolefin composition in the first polyolefin solution ranges from about 25 wt.% to about 40 wt.%, based on the weight of the first polyolefin solution.

Although the amount of first polyolefin composition in the first polyolefin solution is not critical, when the amount is less than about 1 wt. %, it can be more difficult to produce the multi-layer microporous polyolefin membrane at an acceptably efficient rate. Moreover, when the amount is less than 1 wt. %, it can be more difficult to prevent swelling or neck-in at the die exit during extrusion, which can make it more difficult to form and support the multi-layer, gel-like sheet, which is a precursor of the membrane formed during the manufacturing process. On the other hand, when the amount of first polyolefin composition solution is greater than about 75 wt. %, it can be more difficult to form the multi-layer, gel-like sheet.

Step (2) Preparation of Second Polyolefin Solution

The second polyolefin solution can be prepared by the same methods used to prepare the first polyolefin solution. For example, the second polyolefin solution can be prepared by melt-blending a second polyolefin composition with a second membrane-forming solvent. The second membrane-forming solvent can be selected from among the same solvents as the first membrane-forming solvent. And while the second membrane-forming solvent can be (and generally is) selected independently of the first membrane-forming solvent, the second membrane-forming solvent can be the same as the first membrane-forming solvent, and can be used in the same relative concentration as the first membrane-forming solvent is used in the first polyolefin solution.

The second polyolefin composition is generally selected independently of the first polyolefin composition. The second polyolefin composition is produced from the second resin. The second resin contains resins of the fourth polyethylene, and optionally, resins of the third polyethylene and second polypropylene. Since the first and second microporous layer materials generally do not have the same composition, the resins (and their relative amounts) used to produce the second polyolefin composition can be and generally are different from the resins (and relative amounts) used to produce the first polyolefin composition.

Although it is not a critical parameter, the melt-blending conditions for the second polyolefin solution can differ from the conditions described for producing the first polyolefin composition in that the melt-blending temperature of the second polyolefin solution can range from about the melting point $Tm_2$ of the polyethylene in the second resin+10° C. to $Tm_2$+120° C.

The amount of the second polyolefin composition in the second polyolefin solution is not critical. In an embodiment, the amount of second polyolefin composition in the second polyolefin solution can range from about 1 wt. % to about 75 wt. %, based on the weight of the second polyolefin solution, for example from about 20 wt. % to about 70 wt. %.

Step (3) Extrusion

In an embodiment, the first polyolefin solution is conducted from a first extruder to a first die and the second polyolefin solution is conducted from a second extruder to a second die. A layered extrudate in sheet form (i.e., a body significantly larger in the lateral directions than in the thickness direction) can be extruded from the first and second die. Optionally, the first and second polyolefin solutions are co-extruded (e.g., simultaneously) from the first and second die with a planar surface of a first extrudate layer formed from the first polyolefin solution in contact with a planar surface of a second extrudate layer formed from the second polyolefin solution. A planar surface of the extrudate can be defined by a first vector in the machine direction of the extrudate and a second vector in the transverse direction of the extrudate.

In an embodiment, a die assembly is used where the die assembly comprises the first and second die, as for example when the first die and the second die share a common partition between a region in the die assembly containing the first polyolefin solution and a second region in the die assembly containing the second polyolefin solution.

In another embodiment, a plurality of dies is used, with each die connected to an extruder for conducting either the first or second polyolefin solution to the die. For example, in one embodiment, the first extruder containing the first polyolefin solution is connected to a first die and a third die, and a second extruder containing the second polyolefin solution is connected to a second die. As is the case in the preceding embodiment, the resulting layered extrudate can be co-extruded from the first, second, and third die (e.g., simultaneously) to form a three-layer extrudate comprising a first and a third layer constituting surface layers (e.g., top and bottom layers) produced from the first polyolefin solution; and a second layer constituting a middle or intermediate layer of the extrudate situated between and in planar contact with both surface layers, where the second layer is produced from the second polyolefin solution.

In any of the preceding embodiments, die extrusion can be conducted using conventional die extrusion equipment. For example, extrusion can be conducted by a flat die or an inflation die. In one embodiment useful for co-extrusion of multi-layer gel-like sheets, multi-manifold extrusion can be used, in which the first and second polyolefin solutions are conducted to separate manifolds in a multi-layer extrusion die and laminated at a die lip inlet. In another such embodiment, block extrusion can be used, in which the first and second polyolefin solutions are first combined into a laminar flow (i.e., in advance), with the laminar flow then connected to a die. Because multi-manifold and block processes are known to those skilled in the art of processing polyolefin films (e.g., as disclosed in JP06-122142 A, JP06-106599A), they are deemed conventional, therefore, their operation will be not described in detail.

Die selection is not critical, and, e.g., a conventional multi-layer-sheet-forming, flat, tubular, or inflation die can be used. Die gap is not critical. For example, the multi-layer-sheet-forming flat die can have a die gap of about 0.1 mm to about 5 mm. Die temperature and extruding speed are also non-critical parameters. For example, the die can be heated to a die temperature ranging from about 140° C. to about 250° C. during extrusion. The extruding speed can range, for example, from about 0.2m/minute to about 15 m/minute. The thickness of the layers of the layered extrudate can be independently selected. For example, the gel-like sheet can have relatively thick surface layers (or "skin" layers) compared to the thickness of an intermediate layer of the layered extrudate. In an embodiment, where the multi-layer, the layered extrudate is a two-layer, the thickness ratio of the surface layer of the layered extrudate can range, e.g., from about 15% to about 60% based on the total thickness of the layered extrudate, or from about 15% to about 50%. In an embodiment, the thickness of the surface layer (first layer) of the layered extrudate can range, e.g., from about 15 μm to about 3,000μm, or from about 50 μm to about 2,000 μm. In an embodiment, the thickness of the other surface layer (second layer) of the layered extrudate can range, e.g., from about 40μm to about 4,000 μm, or from about 100μm to about 2,000 μm. In an embodiment where the multi-layer, the layered extrudate is a three-layer, the thickness ratio of the layers expressed as (surface layer/intermediate layer/surface layer) can range, e.g., from about 1/(0.015 to 0.95)/1, or from about 1/(0.02 to 0.8)/1, with the thickness of the surface layers normalized to 1. In an embodiment, the thickness of the first and third layer (surface layers) of the layered extrudate can range, e.g., from about 40 μm to about 2,450 μm, or from about 100 μm to about 2,000μm. In an embodiment, the thickness of the intermediate layer (second layer) of the layered extrudate can range, e.g., from about 1μm to about 1,600μm, or from about 20 μm to about 1,000μm.

While the extrusion has been described in terms of embodiments producing two and three-layer extrudates, the extrusion step is not limited thereto. For example, a plurality of dies and/or die assemblies can be used to produce multi-layer extrudates having four or more layers using the extrusion methods of the preceding embodiments. In such a layered extrudate, each surface or intermediate layer can be produced using either the first polyolefin solution and/or the second polyolefin solution.

Step (4) Formation of a Multi-Layer, Gel-Like Sheet

The multi-layer extrudate can be formed into a multi-layer, gel-like sheet by cooling, for example. Cooling rate and cooling temperature are not particularly critical. For example, the multi-layer, gel-like sheet can be cooled at a cooling rate of at least about 50° C./minute until the temperature of the multi-layer, gel-like sheet (the cooling temperature) is approximately equal to the multi-layer, gel-like sheet's gelatin temperature (or lower). In an embodiment, the extrudate is cooled to a temperature of about 25° C. or lower in order to form the multi-layer gel-like sheet. While not wishing to be bound by any theory or model, it is believed that cooling the layered extrudate sets the polyolefin micro-phases of the first and second polyolefin solutions for separation by the membrane-forming solvent or solvents. It has been observed that in general a slower cooling rate (e.g., less than 50° C./minute) provides the multi-layer, gel-like sheet with larger pseudo-cell units, resulting in a coarser higher-order structure. On the other hand, a relatively faster cooling rate (e.g., 80° C./minute) results in denser cell units. Although it is not a critical parameter, when the cooling rate of the extrudate is less than 50° C./minute, increased polyolefin crystallinity in the layer can result, which can make it more difficult to process the multi-layer, gel-like sheet in subsequent stretching steps. The choice of cooling method is not critical. For example conventional sheet cooling methods can be used. In an embodiment, the cooling method comprises contacting the layered extrudate with a cooling medium such as cooling air, cooling water, etc. Alternatively, the extrudate can be cooled via contact with rollers cooled by a cooling medium, etc.

Step (5) Removal of the First and Second Membrane-Forming Solvents

In an embodiment, the first and second membrane-forming solvents are removed (or displaced) from the multi-layer gel-like sheet in order to form a solvent-removed gel-like sheet. A displacing (or "washing") solvent can be used to remove (wash away, or displace) the first and second membrane-forming solvents. While not wishing to be bound by any theory or model, it is believed that because the polyolefin phases in the multi-layer gel-like sheet produced from the first polyolefin solution and the second polyolefin solution (i.e., the first polyolefin and the second polyolefin) are separated from the membrane-forming solvent phase, the removal of the membrane-forming solvent provides a porous membrane constituted by fibrils forming a fine three-dimensional network structure and having pores communicating three-dimensionally and irregularly. The choice of washing solvent is not critical provided it is capable of dissolving or displacing at least a portion of the first and/or second membrane-forming solvent. Suitable washing solvents include, for instance, one or more of volatile solvents such as saturated hydrocarbons such as pentane, hexane, heptane, etc.; chlorinated hydrocarbons such as methylene chloride, carbon tetrachloride, etc.; ethers such as diethyl ether, dioxane, etc.; ketones such as methyl ethyl ketone, etc.; linear fluorocarbons such as trifluoroethane, $C_6F_{14}$, $C_7F_{16}$, etc.; cyclic hydrofluorocarbons such as $C_5H_3F_7$, etc.; hydrofluoroethers such as $C_4F_9OCH_3$, $C_4F_9OC_2H_5$, etc.; and perfluoroethers such as $C_4F_9OCF_3$, $C_4F_9OC_2F_5$, etc.

The method for removing the membrane-forming solvent is not critical, and any method capable of removing a significant amount of solvent can be used, including conventional solvent-removal methods. For example, the multi-layer, gel-like sheet can be washed by immersing the sheet in the washing solvent and/or showering the sheet with the washing solvent. The amount of washing solvent used is not critical, and will generally depend on the method selected for removal of the membrane-forming solvent. For example, the amount of washing solvent used can range from about 300 to about 30,000 parts by mass, based on the mass of the gel-like sheet. While the amount of membrane-forming solvent removed is not particularly critical, generally a higher quality (more porous) membrane will result when at least a major amount of first and second membrane-forming solvent is removed from the gel-like sheet. In an embodiment, the membrane-forming solvent is removed from the gel-like sheet (e.g., by washing) until the amount of the remaining membrane-forming solvent in the multi-layer gel-like sheet becomes less than 1 wt. %, based on the weight of the gel-like sheet.

Step (6) Drying of the Solvent-Removed Gel-Like Sheet

In an embodiment, the solvent-removed multi-layer, gel-like sheet obtained by removing the membrane-forming solvent is dried in order to remove the washing solvent. Any method capable of removing the washing solvent can be used, including conventional methods such as heat-drying, wind-drying (moving air), etc. The temperature of the gel-like sheet during drying (i.e., drying temperature) is not critical. For example, the drying temperature can be equal to or lower than the crystal dispersion temperature Tcd. Tcd is the lower of the crystal dispersion temperature $Tcd_1$ of the polyethylene in the first resin and the crystal dispersion temperature $Tcd_2$ of the polyethylene in the second resin. For example, the drying temperature can be at least 5° C. below the crystal dispersion temperature Tcd. The crystal dispersion temperature of the polyethylene in the first and second resins can be determined by measuring the temperature characteristics of the kinetic viscoelasticity of the polyethylene according to ASTM D 4065. In an embodiment, the polyethylene in at least one of the first or second resins has a crystal dispersion temperature in the range of about 90° C. to about 100° C.

Although it is not critical, drying can be conducted until the amount of remaining washing solvent is about 5 wt. % or less on a dry basis, i.e., based on the weight of the dry multi-layer, microporous polyolefin membrane. In another embodiment, drying is conducted until the amount of remaining washing solvent is about 3 wt. % or less on a dry basis. Insufficient drying can be recognized because it generally leads to an undesirable decrease in the porosity of the multi-layer, microporous membrane. If this is observed, an increased drying temperature and/or drying time should be used. Removal of the washing solvent, e.g., by drying or otherwise, results in the formation of the multi-layer, microporous polyolefin membrane.

Step (7) Stretching

Prior to the step for removing the membrane-forming solvents (namely prior to step 5), the multi-layer, gel-like sheet can be stretched in order to obtain a stretched, multi-layer, gel-like sheet. It is believed that the presence of the first and second membrane-forming solvents in the multi-layer, gel-like sheet result in a relatively uniform stretching magnification. Heating the multi-layer, gel-like sheet, especially at the start of stretching or in a relatively early stage of stretching (e.g., before 50% of the stretching has been completed) is also believed to aid the uniformity of stretching.

Neither the choice of stretching method nor the degree of stretching magnification are particularly critical. For example, any method capable of stretching the multi-layer, gel-like sheet to a predetermined magnification (including any optional heating) can be used. In an embodiment, the stretching can be accomplished by one or more of tenter-stretching, roller-stretching, or inflation stretching (e.g., with air). Although the choice is not critical, the stretching can be conducted monoaxially (i.e., in either the machine or transverse direction) or biaxially (both the machine or transverse direction). In an embodiment, biaxial stretching is used. In the case of biaxial stretching (also called biaxial orientation), the stretching can be simultaneous biaxial stretching, sequential stretching along one planar axis and then the other (e.g., first in the transverse direction and then in the machine direction), or multi-stage stretching (for instance, a combination of the simultaneous biaxial stretching and the sequential stretching). In an embodiment, simultaneous biaxial stretching is used.

The stretching magnification is not critical. In an embodiment where monoaxial stretching is used, the linear stretching magnification can be, e.g., about 2 fold or more, or about 3 to about 30 fold. In an embodiment where biaxial stretching is used, the linear stretching magnification can be, e.g., about 3 fold or more in any lateral direction. In another embodiment, the linear magnification resulting from stretching is at least about 9 fold, or at least about 16 fold, or at least about 25 fold in area magnification. Although it is not a critical parameter, when the stretching results in an area magnification of at least about 9 fold, the multi-layer microporous polyolefin membrane has a relatively higher pin puncture strength. When attempting an area magnification of more than about 400 fold, it can be more difficult to operate the stretching apparatus.

The temperature of the multi-layer, gel-like sheet during stretching (namely the stretching temperature) is not critical. In an embodiment, the temperature of the gel-like sheet during stretching can be about (Tm+10° C.) or lower, or optionally in a range that is higher than Tcd but lower than Tm, wherein Tm is the lesser of the melting point $Tm_1$ of the polyethylene in the first resin and the melting point $Tm_2$ of the polyethylene in the second resin. Although this parameter is not critical, when the stretching temperature is higher than approximately the melting point Tm+10° C., at least one of the first or second resins can be in the molten state, which can make it more difficult to orient the molecular chains of the polyolefin in the multi-layer gel-like sheet during stretching. And when the stretching temperature is lower than approximately Tcd, at least one of the first or second resins can be so insufficiently softened that it is difficult to stretch the multi-layer, gel-like sheet without breakage or tears, which can result in a failure to achieve the desired stretching magnification. In an embodiment, the stretching temperature ranges from about 90° C. to about 140° C., or from about 100° C. to about 130° C.

While not wishing to be bound by any theory or model, it is believed that such stretching causes cleavage between polyethylene lamellas, making the polyethylene phases finer and forming large numbers of fibrils. The fibrils form a three-dimensional network structure (three-dimensionally irregularly connected network structure). Consequently, the stretching when used generally makes it easier to produce a relatively high-mechanical strength multi-layer, microporous polyolefin membrane with a relatively large pore size. Such multi-layer, microporous membranes are believed to be particularly suitable for use as battery separators.

Optionally, stretching can be conducted in the presence of a temperature gradient in a thickness direction (i.e., a direction approximately perpendicular to the planar surface of the multi-layer, microporous polyolefin membrane). In this case, it can be easier to produce a multi-layer, microporous polyolefin membrane with improved mechanical strength. The details of this method are described in Japanese Patent 3347854.

Step (8) Hot Solvent Treatment Step

Although it is not required, the multi-layer, gel-like sheet can be treated with a hot solvent between steps (4) and (5). When used, it is believed that the hot solvent treatment provides the fibrils (such as those formed by stretching the multi-layer gel-like sheet) with a relatively thick leaf-vein-like structure. Such a structure, it is believed, makes it less difficult to produce a multi-layer, microporous membrane having large pores with relatively high strength and permeability. The term "leaf-vein-like" means that the fibrils have thick trunks and thin fibers extending therefrom in a network structure. The details of this method are described in WO 2000/20493.

Step (9) Stretching of multi-layer, microporous membrane ("dry stretching")

In an embodiment, the dried multi-layer, microporous membrane of step (6) can be stretched, at least monoaxially. The stretching method selected is not critical, and conventional stretching methods can be used such as by a tenter method, etc. While it is not critical, the membrane can be heated during stretching. While the choice is not critical, the stretching can be monoaxial or biaxial. When biaxial stretching is used, the stretching can be conducted simultaneously in both axial directions, or, alternatively, the multi-layer, microporous polyolefin membrane can be stretched sequentially, e.g., first in the machine direction and then in the transverse direction. In an embodiment, simultaneous biaxial stretching is used. When the multi-layer gel-like sheet has been stretched as described in step (7) the stretching of the dry multi-layer, microporous polyolefin membrane in step (9) can be called dry-stretching, re-stretching, or dry-orientation.

The temperature of the dry multi-layer, microporous membrane during stretching (the "dry stretching temperature") is not critical. In an embodiment, the dry stretching temperature is approximately equal to the melting point Tm or lower, for example in the range of from about the crystal dispersion temperature Tcd to the about the melting point Tm. When the dry stretching temperature is higher than Tm, it can be more difficult to produce a multi-layer, microporous polyolefin membrane having a relatively high compression resistance with relatively uniform air permeability characteristics, particularly in the transverse direction when the dry multi-layer, microporous polyolefin membrane is stretched transversely. When the stretching temperature is lower than Tcd, it can be more difficult to sufficiently soften the first and second polyolefins, which can lead to tearing during stretching, and a lack of uniform stretching. In an embodiment, the dry stretching temperature ranges from about 90° C. to about 135° C., or from about 95° C. to about 130° C.

When dry-stretching is used, the stretching magnification is not critical. For example, the stretching magnification of the multi-layer, microporous membrane can range from about 1.1 fold to about 1.8 fold in at least one lateral (planar) direction. Thus, in the case of monoaxial stretching, the stretching magnification can range from about 1.1 fold to about 1.8 fold in the machine direction (i.e., the "machine direction") or the transverse direction, depending on whether the membrane is stretched longitudinally or transversely. Monoaxial stretching can also be accomplished along a planar axis between the machine and transverse directions.

In an embodiment, biaxial stretching is used (i.e., stretching along two planar axis) with a stretching magnification of about 1.1 fold to about 1.8 fold along both stretching axes, e.g., along both the machine and transverse directions. The stretching magnification in the machine direction need not be the same as the stretching magnification in the transverse direction. In other words, in biaxial stretching, the stretching magnifications can be selected independently. In an embodiment, the dry-stretching magnification is the same in both stretching directions.

Step (10) Heat Treatment

In an embodiment, the dried multi-layer, microporous membrane can be heat-treated following step (6). It is believed that heat-treating stabilizes the polyolefin crystals in the dried multi-layer, microporous polyolefin membrane to form uniform lamellas. In an embodiment, the heat treatment comprises heat-setting and/or annealing. When heat-setting is used, it can be conducted using conventional methods such as tenter methods and/or roller methods. Although it is not critical, the temperature of the dried multi-layer, microporous polyolefin membrane during heat-setting (i.e., the "heat-setting temperature") can range from the Tcd to about the Tm. In an embodiment, the heat-setting temperature ranges from about the dry stretching temperature of the multi-layer, microporous polyolefin membrane ±5° C., or about the dry stretching temperature of the multi-layer, microporous polyolefin membrane ±3° C.

Annealing differs from heat-setting in that it is a heat treatment with no load applied to the multi-layer, microporous polyolefin membrane. The choice of annealing method is not critical, and it can be conducted, for example, by using a heating chamber with a belt conveyer or an air-floating-type heating chamber. Alternatively, the annealing can be conducted after the heat-setting with the tenter clips slackened. The temperature of the multi-layer, microporous polyolefin membrane during annealing (i.e., the annealing temperature) is not critical. In an embodiment, the annealing temperature ranges from about the melting point Tm or lower, or in a range from about 60° C. to (Tm−10° C.), or in a range of from about 60° C. to (Tm−5° C.). It is believed that anneal-ing makes it less difficult to produce a multi-layer, microporous polyolefin membrane having relatively high permeability and strength.

Step (11) Cross-Linking

In an embodiment, the multi-layer, microporous polyolefin membrane can be cross-linked (e.g., by ionizing radiation rays such as α-rays, β-rays, γ-rays, electron beams, etc.) after step (6). For example, when irradiating electron beams are used for cross-linking, the amount of electron beam radiation can be about 0.1 Mrad to about 100 Mrad, using an accelerating voltage in the range of about 100 kV to about 300 kV. It is believed that the cross-linking treatment makes it less difficult to produce a multi-layer, microporous polyolefin membrane with relatively high meltdown temperature.

Step (12) Hydrophilizing Treatment

In an embodiment, the multi-layer, microporous polyolefin membrane can be subjected to a hydrophilic treatment (i.e., a treatment which makes the multi-layer, microporous polyolefin membrane more hydrophilic). The hydrophilic treatment can be, for example, a monomer-grafting treatment, a surfactant treatment, a corona-discharging treatment, etc. In a preferable embodiment, the monomer-grafting treatment is used after the cross-linking treatment.

When a surfactant treatment is used, any of nonionic surfactants, cationic surfactants, anionic surfactants and amphoteric surfactants can be used, for example, either alone or in combination. In an embodiment, a nonionic surfactant is used. The choice of surfactant is not critical. For example, the multi-layer, microporous polyolefin membrane can be dipped in a solution of the surfactant and water or a lower alcohol such as methanol, ethanol, isopropyl alcohol, etc., or coated with the solution, e.g., by a doctor blade method.

B. Second Production Method

The second method for producing the multi-layer, microporous polyolefin membrane comprises the steps of (1) combining (e.g., by melt-blending) a first polyolefin composition and a first membrane-forming solvent to prepare a first polyolefin solution, (2) combining a second polyolefin composition and a second membrane-forming solvent to prepare a second polyolefin solution, (3) extruding the first polyolefin solution through a first die and the second solution through a second die and then laminating the extruded first and second polyolefin solutions to form a multi-layer extrudate, (4) cooling the multi-layer extrudate to form a multi-layer, gel-like sheet, (5) removing the membrane-forming solvent from the multi-layer, gel-like sheet to form a solvent-removed gel-like sheet, and (6) drying the solvent-removed gel-like sheet in order to form the multi-layer, microporous membrane. An optional stretching step (7), and an optional hot solvent treatment step (8), etc., can be conducted between steps (4) and (5), if desired. After step (6), an optional step (9) of stretching a multi-layer, microporous membrane, an optional heat treatment step (10), an optional cross-linking step with ionizing radiations (11), and an optional hydrophilic treatment step (12), etc., can be conducted.

The process steps and conditions of the second production method are generally the same as those of the analogous steps described in connection with the first production method, except for step (3). Consequently, step (3) will be explained in more detail.

The type of die used is not critical provided the die is capable of forming an extrudate that can be laminated. In one embodiment, sheet dies (which can be adjacent or connected) are used to form the extrudates. The first and second sheet dies are connected to first and second extruders, respectively, where the first extruder contains the first polyolefin solution and the second extruder contains the second polyolefin solution. While not critical, lamination is generally easier to accomplish when the extruded first and second polyolefin solution are still at approximately the extrusion temperature. The other conditions may be the same as in the first method.

In another embodiment, the first, second, and third sheet dies are connected to first, second and third extruders, where the first and third sheet dies contain the first polyolefin solutions, and the second sheet die contains the second polyolefin solution. In this embodiment, a laminated extrudate is formed constituting outer layers comprising the extruded first polyolefin solution and one intermediate comprising the extruded second polyolefin solution.

In yet another embodiment, the first, second, and third sheet dies are connected to first, second, and third extruders, where the second sheet die contains the first polyolefin solution, and the first and third sheet dies contain the second polyolefin solution. In this embodiment, a laminated extrudate is formed constituting outer layers comprising the extruded second polyolefin solution and one intermediate comprising extruded first polyolefin solution.

C. Third Production Method

The third method for producing the multi-layer, microporous polyolefin membrane comprises the steps of (1) combining (e.g., by melt-blending) a first polyolefin composition and a membrane-forming solvent to prepare a first polyolefin solution, (2) combining a second polyolefin composition and a second membrane-forming solvent to prepare a second polyolefin solution, (3) extruding the first polyolefin solution through at least one first die to form at least one first extrudate, (4) extruding the second polyolefin solution through at least one second die to form at least one second extrudate, (5) cooling first and second extrudates to form at least one first gel-like sheet and at least one second gel-like sheet, (6) laminating the first and second gel-like sheet to form a multi-layer, gel-like sheet, (7) removing the membrane-forming solvent from the resultant multi-layer, gel-like sheet to form a solvent-removed gel-like sheet, and (8) drying the solvent-removed gel-like sheet in order to form the multi-layer, microporous membrane. An optional stretching step (9), and an optional hot solvent treatment step (10), etc., can be conducted between steps (5) and (6) or between steps (6) and (7), if desired. After step (8), an optional step (11) of stretching a multi-layer, microporous membrane, an optional heat treatment step (12), an optional cross-linking step with ionizing radiations (13), and an optional hydrophilic treatment step (14), etc., can be conducted.

The main difference between the third production method and the second production method is in the order of the steps for laminating and cooling. In the second production method, laminating the first and second polyolefin solutions is conducted before the cooling step. In the third production method, the first and second polyolefin solutions are cooled before the laminating step.

Steps (1), (2), (7) and (8) in the third production method can be the same as the steps of (1), (2), (5) and (6) in the first production method. For the extrusion of the first polyolefin solution through the first die, the conditions of step (3) of the second production method can be used for step (3) of the third production method. For the extrusion of the second solution through the second die, the conditions of step (4) in the third production method can be the same as the conditions of step (3) in the second production method. In one embodiment, either the first or second polyolefin solution is extruded through a third die. In this way, a multi-layer laminate can be formed having two layers produced from the first polyolefin solution and a single layer produced from the second polyolefin solution, or vice versa.

Step (5) of the third production method can be the same as step (4) in the first production method except that in the third production method the first and second gel-like sheets are formed separately.

Step (6) of laminating the first and second gel-like sheets will now be explained in more detail. The choice of lamination method is not particularly critical, and conventional lamination methods such as heat-induced lamination can be used to laminate the multi-layer gel-like sheet. Other suitable lamination methods include, for example, heat-sealing, impulse-sealing, ultrasonic-bonding, etc., either alone or in combination. Heat-sealing can be conducted using, e.g., one or more pair of heated rollers where the gel-like sheets are conducted through at least one pair of the heated rollers. Although the heat-sealing temperature and pressure are not particularly critical, sufficient heating and pressure should be applied for a sufficient time to ensure that the gel-like sheets are appropriately bonded to provide a multi-layer, microporous membrane with relatively uniform properties and little tendency toward delamination. In an embodiment, the heat-sealing temperature can be, for instance, about 90° C. to about 135° C., or from about 90° C. to about 115° C. In an embodiment, the heat-sealing pressure can be from about 0.01 MPa to about 50 MPa.

As is the case in the first and second production method, the thickness of the layers formed from the first and second polyolefin solution (i.e., the layers comprising the first and second microporous layer materials) can be controlled by adjusting the thickness of the first and second gel-like sheets and by the amount of stretching (stretching magnification and dry stretching magnification), when one or more stretching steps are used. Optionally, the lamination step can be combined with a stretching step by passing the gel-like sheets through multi-stages of heated rollers.

In an embodiment, the third production method forms a multi-layer, polyolefin gel-like sheet having at least three layers. For example, after cooling two extruded first polyolefin solutions and one extruded second polyolefin solution to form the gel-like sheets, the multi-layer gel-like sheet can be laminated with outer layers comprising the extruded first polyolefin solution and an intermediate layer comprising the extruded second polyolefin solution. In another embodiment, after cooling two extruded second polyolefin solutions and one extruded first polyolefin solution to form the gel-like sheets, the multi-layer gel-like sheet can be laminated with outer layers comprising the extruded second polyolefin solution and an intermediate layer comprising the extruded first polyolefin solution.

The stretching step (9) and the hot solvent treatment step (10) can be the same as the stretching step (7) and the hot solvent treatment step (8) as described for the first production method, except stretching step (9) and hot solvent treatment step (10) are conducted on the first and/or second gel-like sheets. The stretching temperatures of the first and second gel-like sheets are not critical. For example, the stretching temperatures of the first gel-like sheet can be, e.g., $Tm_1+10°$ C. or lower, or optionally about $Tcd_1$ or higher but lower than about $Tm_1$. The stretching temperature of the second gel-like sheet can be, e.g., $Tm_2+10°$ C. or lower, or optionally about $Tcd_2$ or higher but lower than about $Tm_2$.

In another embodiment, the stretching temperature of the first gel-like sheet ranges from about the crystal dispersion temperature $Tcd_1$ of the polyethylene in the first resin to $Tcd_1+25°$ C., or from about $Tcd_1+10°$ C. to $Tcd_1+25°$ C., or from about $Tcd_1+15°$ C. to $Tcd_1+25°$ C. The stretching temperature of the second gel-like sheet ranges from the crystal dispersion temperature $Tcd_2$ of the polyethylene in the second resin to about $Tcd_2+25°$ C., or about $Tcd_2+10°$ C. to $Tcd_2+25°$ C., or about $Tcd_2+15°$ C. to $Tcd_2+25°$ C.

D. Fourth Production Method

The fourth method for producing the multi-layer, microporous polyolefin membrane comprises the steps of (1) combining (e.g., by melt-blending) a first polyolefin composition and a membrane-forming solvent to prepare a first polyolefin solution, (2) combining a second polyolefin composition and a second membrane-forming solvent to prepare a second polyolefin solution, (3) extruding the first polyolefin solution through at least one first die to form at least one first extrudate, (4) extruding the second polyolefin solution through at least one second die to form at least one second extrudate, (5) cooling first and second extrudates to form at least one first gel-like sheet and at least one second gel-like sheet, (6) removing the first and second membrane-forming solvents from the first and second gel-like sheets to form solvent-removed first and second gel-like sheets, (7) drying the solvent-removed first and second gel-like sheets to form at least one first polyolefin membrane and at least one second polyolefin membrane, and (8) laminating the first and second microporous polyolefin membranes in order to form the multi-layer, microporous polyolefin membrane.

A stretching step (9), a hot solvent treatment step (10), etc., can be conducted between steps (5) and (6), if desired. A stretching step (11), a heat treatment step (12), etc., can be conducted between steps (7) and (8), if desired. After step (8), a step (13) of stretching a multi-layer, microporous membrane, a heat treatment step (14), a cross-linking step with ionizing radiations (15), a hydrophilic treatment step (16), etc., can be conducted if desired.

Steps (1) and (2) in the fourth production method can be conducted under the same conditions as steps of (1) and (2) in the first production method. Steps (3), (4), and (5) in the fourth production method can be conducted under the same conditions as steps (3), (4), and (5) in the third method. Step (6) in the fourth production method can be conducted under the same conditions as step (5) in the first production method except for removing the membrane-forming solvent from the first and second gel-like sheets. Step (7) in the fourth production method can be conducted under the same conditions as step (6) in the first production method except that in the fourth production method the first and second solvent-removed gel-like sheets are dried separately. Step (8) in the fourth production method can be conducted under the same conditions as the step (6) in the third production method except for laminating the first and second polyolefin microporous membranes. The stretching step (9) and the hot solvent treatment step (10) in the fourth production method can be conducted under the same conditions as step (9) and (10) in the third production method. The stretching step (11) and the heat treatment step (12) in the fourth production method can be conducted under the same conditions as steps (9) and (10) in the first production method except that in the fourth production method the first and second polyolefin microporous membranes are stretched and/or heat treated.

In an embodiment, in the stretching step (11) in the fourth production method, the stretching temperature of the first microporous polyolefin membrane can be about $Tm_1$ or lower, or optionally about $Tcd_1$ to about $Tm_1$, and the stretching temperature of the second microporous polyolefin membrane can be about $Tm_2$ or lower, or optionally about $Tcd_2$ to about $Tm_2$.

In an embodiment, the heat treatment step (12) in the fourth production method can be heat-setting and/or annealing. For example, in the heat treatment step (12) in the fourth production method, the heat-setting temperature of the first polyolefin microporous membranes can be about $Tcd_1$ to about $Tm_1$, or optionally about the dry stretching temperature $\pm 5°$ C., or optionally about the dry stretching temperature $\pm 3°$ C. In an embodiment, in the heat treatment step (12) in the fourth production method, the heat-setting temperature of the second microporous membrane can be about $Tcd_2$ to about $Tm_2$, or optionally the dry stretching temperature $\pm 5°$ C., or optionally the dry stretching temperature $\pm 3°$ C. When the heat-setting is used, it can be conducted by, e.g., a tenter method or a roller method.

In an embodiment, in the heat treatment step (12) in the fourth production method, the annealing temperature of the first microporous membrane can be about $Tm_1$ or lower, or optionally about 60° C. to about ($Tm_1-10°$ C.). In an embodiment, in the heat treatment step (12) in the fourth production method, the annealing temperature of the second microporous membranes can be about $Tm_2$ or lower, or optionally about 60° C. to about ($Tm_2-10°$ C.).

The conditions in step (13), stretching a multi-layer, microporous membrane, a heat treatment step (14), a cross-linking step with ionizing radiations (15), and a hydrophilic treatment step (16) in the fourth production method can be the same as those for steps (9), (10), (11) and (12) in the first production method.

[4] Structure, Properties, And Composition Of Multi-Layer, Microporous Polyolefin Membrane In an embodiment, the multi-layer, microporous polyolefin membrane comprises a first (or top) layer, a third (or bottom) layer, and a second (middle) layer located between the first and the third layer. The first and third layers constitute the top and bottom surfaces respectively of the membrane when the membrane is horizontal. The multi-layer, microporous polyolefin membrane further comprises a second layer situated between the first and third layers, and optionally in contact with (e.g., adhered to) the first and/or third layer. Since the second layer is, situated between the first and third layers, it can be referred to as a "middle" or "intermediate" layer. In an embodiment, the multi-layer, microporous polyolefin membrane further comprises a plurality of intermediate layers.

In an embodiment, the first and third layers of the multi-layer, microporous polyolefin membrane both comprise the same first microporous layer material. The second layer of the multi-layer, microporous polyolefin membrane comprises a second microporous layer material. In another embodiment, the first and third layers consist essentially of, or alternatively consist of, the first microporous layer material; and the second layer consists of, or alternatively consists essentially of, the second microporous layer material. Additional intermediate layers beside the second intermediate layer are optional. When present, they can comprise, consist of, or consist essentially of the first or second microporous layer material, as desired, or some other layer material having desired strength, stability, electrolyte permeability properties, etc.

(A) Properties of the First Microporous Layer Material (1) Average Pore Size

In an embodiment, the average pore size of the pores of first microporous layer material ranges from 0.02 to 0.5 µm, preferably from 0.02 to 0.1 µm. As used herein, the term "pore size" is analogous to the pore size in the case where the pores are approximately spherical.

(2) Structure

In an embodiment, the first microporous layer material has is characterized by a hybrid structure. A hybrid structure exists when the pore size distribution curve as obtained by mercury intrusion porosimetry has at least two peaks, a main peak in a pore size ranging from 0.01 to 0.08 µm, and at least one sub-peak in a pore size range of greater than 0.08 µm to 1.5 μm. See, e.g., FIG. 1. The main peak represents dense domains, and the sub-peaks represent coarse domains. It is the presence of the relatively coarse domains in the first layer material that result in the pores of the first layer material having a relatively larger average pore size than the pores of the second microporous layer material. It is believed that whether a hybrid structure forms depends mainly on polymer resins used to produce the first resin. For example, when the amount of ultra-high-molecular-weight polyethylene in the first resin is more than 7% by mass based on the mass of the first resin, it can be more difficult to form the desired hybrid structure. The presence of a hybrid structure in the first microporous layer material is generally desired because, it is believed, the hybrid structure leads to relatively high poor electrolytic solution absorption properties in the multi-layer, microporous polyolefin membrane.

Optionally, the first microporous layer comprises dense domains having a main peak (first peak) in a pore size ranging from about 0.04 μm to about 0.07 μm, and coarse domains having at least a second peak at a pore size ranging from about 0.1 μm to about 0.11 μm, a third peak at a pore size of about 0.7 μm, and a fourth peak at a pore size ranging from about 1 μm to 1.1 μm. FIG. 1 shows an example of the measured pore size distribution curve. In this example, the first to fourth peaks are located at about 0.06 μm, about 0.1 μm, about 0.7 μm, and about 1.1 μm respectively.

The pore volume of the dense domains is calculated from the area of the main peak (first peak), and the pore volume of the coarse domains is calculated from the total area of the sub-peaks (second to fourth peaks). The pore volume ratio of the dense domains to the coarse domains is determined by $S_1$ and $S_2$ shown in FIG. 1. A hatched area $S_1$ on the smaller diameter side than a vertical line $L_1$ passing the first peak corresponds to the pore volume of the dense domains, and a hatched area $S_2$ on the larger diameter side than a vertical line $L_2$ passing the second peak corresponds to the pore volume of the coarse domains. The pore volume ratio $S_1/S_2$ of the dense domains to the coarse domains is not critical, and can range, e.g., from about 0.5 to about 49, or from about 0.6 to about 10, or about 0.7 to about 2.

Although it is not critical, the dense domains and the coarse domains in the first microporous layer material can be irregularly entangled to form a hybrid structure in any cross sections of the first microporous layer as viewed in machine and transverse directions. The hybrid structure can be observed by a transmission electron microscope (TEM), etc.

(3) Number of Layers

In an embodiment, the first microporous layer material constitutes at least both surface layers (i.e., the first and third layers) of a three-layer, microporous polyolefin membrane. In another embodiment, the multi-layer, microporous polyolefin membrane has more than three layers, with both surface layers, and optionally one or more of the interior layers, comprising the first microporous layer material.

(4) Function of First Microporous Layer

When the multi-layer, microporous polyolefin membrane is a two-layer membrane, one surface layer of the membrane comprises the first microporous layer material and the second surface layer comprises the second microporous layer material. Since in this embodiment the multi-layer, microporous polyolefin membrane is a two-layer membrane, there are no interior layers. In this embodiment, the first surface layer has a larger average pore size than the second surface layer. The first surface layer generally has a relatively high permeability, electrolytic solution absorption, and compression resistance compared to the second layer.

When the multi-layer, microporous polyolefin membrane is a three-layer membrane, both surface layers of the membrane comprises the first microporous layer material and the at least one interior layer comprises the second microporous layer material. In this embodiment, the first and second surface layers have a larger average pore size than the interior layer or layers comprising the second microporous layer material. The surface layers generally have a relatively high permeability, electrolytic solution absorption, and compression resistance compared to the interior layer or layers comprising the second layer material.

(B) Properties of the Second Microporous Layer Material (1) Average Pore Size

In an embodiment, the average pore size of the second microporous layer material ranges from about 0.005 μm to about 0.1 μm, or from about 0.01 μm to about 0.05 μm.

(2) Number of Layers

In an embodiment, the second layer material constitutes one surface layer of a two-layer microporous polyolefin membrane, with the first layer material constituting the other surface layer.

In another embodiment, the multi-layer, microporous polyolefin membrane is a three-layer membrane, i.e., it consists of three layers—a first layer constituting a first surface layer of the membrane, a third layer constituting a second surface layer of the membrane, and a second layer constituting an interior layer located between the first and third layers and in planar contact with the first and third layers. The second layer comprises the second layer material. Multi-layer, microporous polyolefin membrane having more than three layers comprise a first layer constituting a first surface layer of the membrane, a third layer constituting a second surface layer of the membrane, and at least two interior layers located between the first and third layers. The first and third layers comprise the first layer material and at least one of the interior layers comprise the second layer material.

(3) Function of Second Microporous Layer

It is believed that when the multi-layer, microporous polyolefin membranes has at least one layer comprising the first microporous layer material and at least one layer comprising the second microporous layer material, it is less difficult to produce a battery separator having suitably high permeability, electrolytic solution absorption and compression resistance characteristics.

(C) Average Pore Size Ratio

In an embodiment, the average pore size ratio of the pores in the second microporous layer material to the first microporous layer material ranges, e.g., from a value larger than 1/1 to about 10/1, or from about 1.5/1 to about 5/1.

(D) Arrangement and Thickness Ratios of First, and, Second Microporous Layer Materials In an embodiment where the multi-layer, microporous polyolefin membrane is a two-layer membrane, the thickness of the first surface layer can range, e.g., from 15% to 60% based on the total thickness of the multi-layer microporous polyolefin membrane, or from about 15% to 50%. In an embodiment where the multi-layer, microporous polyolefin membrane is a three-layer membrane, the thickness ratio of the layers expressed as (first microporous layer/second microporous layer/third microporous layer) can range, e.g., from about 1/(0.015 to 0.95)/1, or from about 1/(0.02 to 0.8)/1, with the thicknesses of the first and third microporous layers normalized to 1. When this thickness ratio is less than about 1/0.015/1, it is more difficult to produce a multi-layer, microporous polyolefin membrane having a relatively high meltdown temperature. When this thickness ratio is greater than about 1/0.95/1, it can be more difficult to produce a battery separator having suitable electrolytic solution absorption characteristics. The total thickness multi-layer, microporous polyolefin membrane is not critical. For example, the multi-layer, microporous polyolefin membrane can have a total thickness ranging from about 3 µm to about 200 µm, or from about 5 µm to 50 µm, or from about 10 µm to about 35 µm.

(E) Properties of the Multi-Layer, Microporous Polyolefin Membrane

In an embodiment, the multi-layer, microporous polyolefin membrane has one or more of the following properties. In another embodiment, the multi-layer, microporous polyolefin membrane has all of the following properties.

(1) Air Permeability of About 20 Seconds/100 cm$^3$ to About 400 Seconds/100 cm$^3$ (Converted to Value at 20-µm Thickness)

When the air permeability of the multi-layer, microporous polyolefin membrane (as measured according to JIS P8117) ranges from about 20 seconds/100 cm$^3$ to about 400 seconds/100 cm$^3$, it is less difficult to form batteries having the desired charge storage capacity and desired cyclability. When the air permeability is less than about 20 seconds/100 cm$^3$, it is more difficult to produce a battery having the desired shutdown characteristics, particularly when the temperatures inside the batteries are elevated. Air permeability $P_1$ measured on a multi-layer, microporous membrane having a thickness $T_1$ according to JIS P8117 can be converted to air permeability $P_2$ at a thickness of 20 µm by the equation of $P_2=(P_1 \times 20)/T_1$.

(2) Porosity of 25 to 80%

When the porosity is less than 25%, the multi-layer, microporous polyolefin membrane generally does not exhibit the desired air permeability for use as a battery separator. When the porosity exceeds 80%, it is more difficult to produce a battery separator of the desired strength, which can increase the likelihood of internal electrode short-circuiting.

(3) Pin Puncture Strength of 2,000 mN or More (Converted to the Value at 20-µm Thickness)

The pin puncture strength (converted to the value at 20-µm thickness) is the maximum load measured when the multi-layer, microporous polyolefin membrane is pricked with a needle 1 mm in diameter with a spherical end surface (radius R of curvature: 0.5 mm) at a speed of 2 mm/second. When the pin puncture strength of the multi-layer, microporous polyolefin membrane is less than 2,000 mN/20 µm, it is more difficult to produce a battery having the desired mechanical integrity, durability, and toughness.

(4) Tensile Rupture Strength of 49,000 kPa or More

When the tensile strength according to ASTM D882 of the multi-layer, microporous polyolefin membrane is at least about 49,000 kPa in both machine and transverse directions, it is less difficult to produce a battery of the desired mechanical strength. The tensile strength of the multi-layer, microporous polyolefin membrane is preferably 80,000 kPa or more.

(5) Tensile Rupture Elongation of 100% or More

When the tensile elongation according to ASTM D882 of the multi-layer, microporous polyolefin membrane is 100% or more in both machine and transverse directions, it is less difficult to produce a battery having the desired mechanical integrity, durability, and toughness.

(6) Heat Shrinkage Ratio of 12% or Less

When the heat shrinkage ratio measured after holding the multi-layer, microporous polyolefin membrane at a membrane temperature of about 105° C. for 8 hours exceeds 12% in both machine and transverse directions, it is more difficult to produce a battery that will not exhibit internal short-circuiting when the heat generated in the battery results in the shrinkage of the separators.

(7) Meltdown Temperature of 150° C. or Higher

In an embodiment, the meltdown temperature can range from about 150° C. to about 190° C. One way to measure meltdown temperature involves determining the temperature at which a multi-layer, microporous polyolefin membrane test piece of 3 mm in the machine direction and 10 mm in the transverse direction is broken by melting, under the conditions that the test piece is heated from room temperature at a heating rate of 5° C./minute while drawing the test piece in the machine direction under a load of 2 g.

(8) Surface Roughness of 3×10$^2$ nm or More

The surface roughness of the first microporous layer material measured by an atomic force microscope (AFM) in a dynamic force mode is about 3×10$^2$ nm or more (based on maximum height differences on the surface of the layer). In another embodiment, the surface roughness is preferably 3.5×10$^2$ nm or more.

[5] Battery Separator

In an embodiment, the battery separator comprises the multi-layer microporous polyolefin membrane. The thickness of the battery separator is not critical, and can range from, e.g., about 3 µm to about 200 µm, or from about 5 µm to about 50 µm. In an embodiment, the battery separator has a thickness ranging from about 10 µm to about 35 µm. Those skilled in the art are aware that the thickness of the separator depends on the type and intended use of the battery.

[6] Battery

In an embodiment, the multi-layer, microporous polyolefin membrane can be used as a separator for primary and secondary batteries such as lithium ion batteries, lithium-polymer secondary batteries, nickel-hydrogen secondary batteries, nickel-cadmium secondary batteries, nickel-zinc secondary batteries, silver-zinc secondary batteries, and particularly for lithium ion secondary batteries. Explanations will be made below on the lithium ion secondary batteries.

The lithium secondary battery comprises a cathode, an anode, and a separator located between the anode and the cathode. The separator generally contains an electrolytic solution (electrolyte). The electrode structure is not critical, and conventional electrode structures can be used. The electrode structure may be, for instance, a coin type in which a disc-shaped cathode and anode are opposing, a laminate type in which a planar cathode and anode are alternately laminated with at least one separator situated between the anode and the cathode, a toroidal type in which ribbon-shaped cathode and anode are wound, etc.

The cathode generally comprises a current collector, and a cathodic-active material layer capable of absorbing and discharging lithium ions, which is formed on the current collector. The cathodic-active materials can be, e.g., inorganic compounds such as transition metal oxides, composite oxides of lithium and transition metals (lithium composite oxides), transition metal sulfides, etc. The transition metals can be, e.g., V, Mn, Fe, Co, Ni, etc. In an embodiment, the lithium composite oxides are lithium nickelate, lithium cobaltate, lithium manganate, laminar lithium composite oxides based on α-NaFeO$_2$, etc. The anode generally comprises a current collector, and a negative-electrode active material layer formed on the current collector. The negative-electrode active materials can be, e.g., carbonaceous materials such as natural graphite, artificial graphite, cokes, carbon black, etc.

The electrolytic solutions can be obtained by dissolving lithium salts in organic solvents. The choice of solvent and/or lithium salt is not critical, and conventional solvents and salts can be used. The lithium salts can be, e.g., $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, $LiN(C_2F_5SO_2)_2$, $LiPF_4(CF_3)_2$, $LiPF_3(C_2F_5)_3$, lower aliphatic carboxylates of lithium, $LiAlCl_4$, etc. The lithium salts may be used alone or in combination. The organic solvents can be organic solvents having relatively high boiling points (compared to the battery's shutdown temperature) and high dielectric constants. Suitable organic solvents include ethylene carbonate, propylene carbonate, ethylmethyl carbonate, γ-butyrolactone, etc.; organic solvents having low boiling points and low viscosity such as tetrahydrofuran, 2-methyltetrahydrofuran, dimethoxyethane, dioxolane, dimethyl carbonate, diethyl carbonate, and the like, including mixtures thereof Because the organic solvents generally having high dielectric constants generally also have a high viscosity, and vice versa, mixtures of high- and low-viscosity solvents can be used.

When the battery is assembled, the separator is generally impregnated with the electrolytic solution, so that the separator (multi-layer, microporous membrane) is provided with ion permeability. The choice of impregnation method is not critical, and conventional impregnation methods can be used. For example, the impregnation treatment can be conducted by immersing the multi-layer, microporous membrane in an electrolytic solution at room temperature.

The method selected for assembling the battery is not critical, and conventional battery-assembly methods can be used. For example, when a cylindrical battery is assembled, a cathode sheet, a separator formed by the multi-layer, microporous membrane and an anode sheet are laminated in this order, and the resultant laminate is wound to a toroidal-type electrode assembly. A second separator might be needed to prevent short-circuiting of the toroidal windings. The resultant electrode assembly can be deposited into a battery can and then impregnated with the above electrolytic solution, and a battery lid acting as a cathode terminal provided with a safety valve can be caulked to the battery can via a gasket to produce a battery.

EXAMPLES

The present invention will be explained in more detail referring to the following examples.

Example 1

(1) Preparation of First Polyolefin Solution

Dry-blended were 99.8 parts by mass of a first polyethylene composition comprising 2% by mass of ultra-high-molecular-weight polyethylene (UHMWPE) having a weight-average molecular weight (Mw) of $2.0 \times 10^6$, a molecular weight distribution (Mw/Mn) of 8, a melting point (Tm) of 135° C., and a crystal dispersion temperature (Tcd) of 100° C., and 98% by mass of high-density polyethylene (HDPE) having Mw of $3.0 \times 10^5$ and Mw/Mn of 8.6, Tm of 135° C., and Tcd of 100° C., and 0.2 parts by mass of tetrakis[methylene-3-(3,5-ditertiary-butyl-4-hydroxyphenyl)-propionate]methane as an antioxidant. The first polyethylene composition had Mw of $3.3 \times 10^5$ and Mw/Mn of 9.4, Tm of 135° C., and Tcd of 100° C. 40 parts by mass of the resultant mixture was charged into a strong-blending double-screw extruder having an inner diameter of 58 mm and L/D of 52.5, and 60 parts by mass of liquid paraffin [50 cst (40° C.)] was supplied to the double-screw extruder via a side feeder. Melt-blending was conducted at 210° C. and 200 rpm to prepare a first polyolefin solution.

(2) Preparation of Second Polyolefin Solution

Dry-blended were 99.8 parts by mass of UHMWPE, and 0.2 parts by mass of the above antioxidant. 5 parts by mass of the mixture was charged into the same strong-blending double-screw extruder as above, and 95 parts by mass of the same liquid paraffin as above was supplied to the double-screw extruder via a side feeder. Melt-blending was conducted at 210° C. and 200 rpm to prepare a second polyolefin solution.

The Mw and Mw/Mn of each UHMWPE and HDPE were measured by a gel permeation chromatography (GPC) method under the following conditions.

Measurement apparatus: GPC-150C available from Waters Corporation,
Column: Shodex UT806M available from Showa Denko K.K.,
Column temperature: 135° C.,
Solvent (mobile phase): o-dichlorobenzene,
Solvent flow rate: 1.0 ml/minute,
Sample concentration: 0.1% by weight (dissolved at 135° C. for 1 hour),
Injected amount: 500 μl,
Detector: Differential Refractometer available from Waters Corp., and
Calibration curve: Produced from a calibration curve of a single-dispersion, standard polystyrene sample using a predetermined conversion constant.

(3) Production of the Microporous Polyolefin Membrane

The first and second polyolefin solutions were supplied from their double-screw extruders to a three-layer-sheet-forming T-die at 210° C., forming a laminate of first solution layer/second solution layer/first solution layer at a thickness ratio of 1/0.2/1 was extruded. The extrudate was cooled while passing through cooling rolls controlled at 0° C., to form a three-layer, gel-like sheet. Using a tenter-stretching machine, the three-layer, gel-like sheet was simultaneously biaxially stretched at 116.5° C. to 5 fold in both machine and transverse directions. The stretched three-layer, gel-like sheet was fixed to an aluminum frame of 20 cm×20 cm, and immersed in a bath of methylene chloride controlled at a temperature of 25° C. to remove the liquid paraffin with vibration of 100 rpm for 3 minutes. The resulting membrane was air-cooled at room temperature. The dried membrane was re-stretched by a batch-stretching machine to a magnification of 1.4 fold in a transverse direction at 127° C. The re-stretched membrane, which remained fixed to the batch-stretching machine, was heat-set at 127° C. for 10 minutes to produce a three-layer, microporous polyolefin membrane.

Example 2

(1) Preparation of First Polyolefin Solution

A first polyolefin solution was prepared in the same manner as in Example 1.

(2) Preparation of Second Polyolefin Solution

Dry-blended were 100 parts by mass of a polyethylene composition comprising 50% by mass of UHMWPE, and 50% by mass of HDPE, and 0.2 parts by mass of the above antioxidant. 15 parts by mass of the mixture was charged into the double-screw extruder, and 85 parts by mass of the liquid paraffin was supplied to the double-screw extruder via a side feeder. Melt-blending was conducted at 210° C. and 200 rpm to prepare a second polyolefin solution. The second polyethylene composition had Mw of $1.2 \times 10^6$ and Mw/Mn of 18.7, Tm of 135° C., and Tcd of 100° C.

(3) Production of the Microporous Polyolefin Membrane

A three-layer, microporous polyolefin membrane was produced in the same manner as in Example 1, except that the first and second polyolefin solutions were extruded at a thickness ratio of first solution layer/second solution layer/first solution layer=1/1/1, that the stretching temperature of the gel-like sheet was 117° C., and that the stretching and heat-setting temperatures of the multi-layer, microporous polyolefin membrane were 126° C.

Example 3

(1) Preparation of First Polyolefin Solution

A first polyolefin solution was prepared in the same manner as in Example 1.

(2) Preparation of Second Polyolefin Solution

Dry-blended were 100 parts by mass of a second polyolefin comprising 30% by mass of UHMWPE having Mw of $5.0 \times 10^6$, Mw/Mn of 8.2, Tm of 135° C., and Tcd of 100° C., and 70% by mass of HDPE, and 0.2 parts by mass of the above antioxidant. 25 parts by mass of the mixture was charged into a double-screw extruder, and 75 parts by mass of liquid paraffin was supplied to the double-screw extruder via a side feeder. Melt-blending was conducted at 210° C. and 200 rpm to prepare a second polyolefin solution. The second polyethylene composition had Mw of $8.1 \times 10^5$, Mw/Mn of 17.2, Tm of 135° C., and Tcd of 100° C.

(3) Production of the Microporous Polyolefin Membrane

A three-layer, microporous polyolefin membrane was produced in the same manner as in Example 1, except that the first and second polyolefin solutions were extruded at a thickness ratio of first solution layer/second solution layer/first solution layer=1/0.5/1, and that the stretching temperature of the gel-like sheet was 117° C.

Example 4

A three-layer, microporous polyolefin membrane was produced in the same manner as in Example 1, except that the stretching temperature of the gel-like sheet was 117.5° C., and that the multi-layer, microporous polyolefin membrane was re-stretched to a magnification of 1.6 fold.

Example 5

(1) Preparation of First Polyolefin Solution

A first polyolefin solution was prepared in the same manner as in Example 1 except for using a composition comprising 2% by mass of UHMWPE, 93% by mass of HDPE and 5% by mass of PP having Mw of $5.3 \times 10^5$. The first polyethylene composition had Mw of $3.3 \times 10^5$ and Mw/Mn of 9.5, Tm of 135° C., and Tcd of 100° C. The Mw of PP was measured by a GPC method as above.

(2) Preparation of Second Polyolefin Solution

A second polyolefin solution was prepared in the same manner as in Example 1.

(3) Production of the Microporous Polyolefin Membrane

A three-layer, microporous polyolefin membrane was produced in the same manner as in Example 1, except that the first and second polyolefin solutions were extruded at a thickness ratio of first solution layer/second solution layer/first solution layer=1/0.5/1, and that the stretching temperature of the gel-like sheet was 117.5° C.

Example 6

(1) Preparation of First Polyolefin Solution

A first polyolefin solution was prepared in the same manner as in Example 1.

(2) Preparation of Second Polyolefin Solution

A second polyolefin solution was prepared in the same manner as in Example 2, except for setting its concentration at 20% by mass.

(3) Production of the Microporous Polyolefin Membrane

The first and second polyolefin solutions were supplied from their double-screw extruders to a two-layer-extruding T-die, and simultaneously extruded therefrom at a thickness ratio of first solution layer/second solution layer=1/1, cooled by cooling rolls controlled at 0° C. while reeling up, to form a two-layer, gel-like sheet. The two-layer, gel-like sheet was simultaneously biaxially stretched at 117.5° C., washed, dried by air, re-stretched, and heat-set in the same manner as in Example 1 to form a two-layer, microporous polyolefin membrane.

Example 7

(1) Preparation of First Polyolefin Solution

Dry-blended were 100 parts by mass of HDPE, and 0.2 parts by mass of the above antioxidant. 40 parts by mass of the resultant mixture was charged into the same strong-blending double-screw extruder as above, and 60 parts by mass of the same liquid paraffin as above was supplied to the double-screw extruder via a side feeder. Melt-blending was conducted at 210C and 200 rpm to prepare a first polyolefin solution.

(2) Preparation of Second Polyolefin Solution

A second polyolefin solution was prepared in the same manner as in Example 2.

(3) Production of the Microporous Polyolefin Membrane

A three-layer, microporous polyolefin membrane was produced in the same manner as in Example 1, except that the first and second polyolefin solutions were extruded at a thickness ratio of first solution layer/second solution layer/first solution layer=1/0.5/1, and that the stretching temperature of the gel-like sheet was 117.5° C.

Comparative Example 1

A three-layer, microporous polyolefin membrane was produced in the same manner as in Example 1, except that the same second polyolefin solution as in Example 1 except that its concentration was 7% by mass was used, that the first and second polyolefin solutions were extruded at a thickness ratio of first solution layer/second solution layer/first solution layer=1/2/1, that the stretching temperature of the gel-like sheet was 118° C., and that the stretching and heat-setting temperatures of the multi-layer, microporous polyolefin membrane were 128° C.

Comparative Example 2

A three-layer, microporous polyolefin membrane was produced in the same manner as in Example 1, except that the first and second polyolefin solutions were extruded at a thickness ratio of first solution layer/second solution layer/first solution layer=1/0.5/1, that the stretching temperature of the multi-layer, gel-like sheet was 118° C., and that the stretching and heat-setting temperatures of the multi-layer, microporous polyolefin membrane were 129° C.

Comparative Example 3

A microporous polyethylene membrane was produced in the same manner as in Example 1, except that only the first polyolefin solution was used, that the gel-like sheet was stretched at 118.5° C., and that the microporous polyolefin membrane was stretched at 129° C. and heat-set at 129° C. for 12 seconds.

Comparative Example 4

Dry-blended were 100 parts by mass of 18% by mass of UHMWPE having Mw of $2.0\times10^6$, and Mw/Mn of 8, and 82% by mass of HDPE having Mw of $3.0\times10^5$, and Mw/Mn of 13.5, and 0.2 parts by mass of the above antioxidant. 30 parts by mass of the mixture was charged into a double-screw extruder, and 70 parts by mass of liquid paraffin was supplied to the double-screw extruder via a side feeder. Melt-blending was conducted at 210° C. and 200 rpm to prepare a second polyolefin solution. The second polyethylene composition had Mw of $6.5\times10^5$ and Mw/Mn of 20.9. A microporous polyethylene membrane was produced in the same manner as in Example 1, except that only the second polyolefin solution was used, that the gel-like sheet was stretched at 115° C., and that the polyethylen membrane was stretched at 124.5° C. and heat-set at 124.5° C. for 12 seconds.

The properties of the (triple-layer) microporous polyolefin membranes obtained in Examples 1-7 and Comparative Examples 1-4 were measured by the following methods. The results are shown in Table 1.

(1) Average Thickness (μm)

The thickness of each multi-layer, microporous membrane was measured by a contact thickness meter at 5 mm machine direction intervals over the width of 30 cm, and averaged.

(2) Layer Thickness Ratio

Three membranes obtained by peeling each three-layer, microporous polyolefin membrane were measured with respect to thickness by a contact thickness meter over a width of 30 cm at a machine interval of 10 mm, and the measured thickness was averaged. The thickness ratio was calculated from the average thickness of each membrane.

(3) Air Permeability (sec/100 cm³/20 μm)

Air permeability $P_1$ measured on each (triple-layer) microporous polyolefin membrane having a thickness $T_1$ according to JIS P8117 was converted to air permeability $P_2$ at a thickness of 20 μm by the equation of $P_2=(P_1\times20)/T_1$.

(4) Porosity (%)

Measured by conventional weight methods.

(5) Pin Puncture Strength (mN/20 μm)

The maximum load was measured, when each multi-layer, microporous membrane having a thickness of $T_1$ was pricked with a needle of 1 mm in diameter with a spherical end surface (radius R of curvature: 0.5 mm) at a rate of 2 mm/second. The measured maximum load $L_1$ was converted to the maximum load $L_2$ at a thickness of 20 μm by the equation of $L_2=(L_1\times20)/T_1$, and used as pin puncture strength.

(6) Tensile Rupture Strength and Tensile Rupture Elongation

Measured on a 10-mm-wide rectangular test piece according to ASTM -D882.

(7) Heat Shrinkage Ratio (%)

The shrinkage ratio of each multi-layer, microporous membrane was measured three times in both machine and transverse directions after maintaining a membrane temperature 105° C. for 8 hours, and averaging the measured shrinkages.

(8) Meltdown Temperature (° C.)

Figure 2:
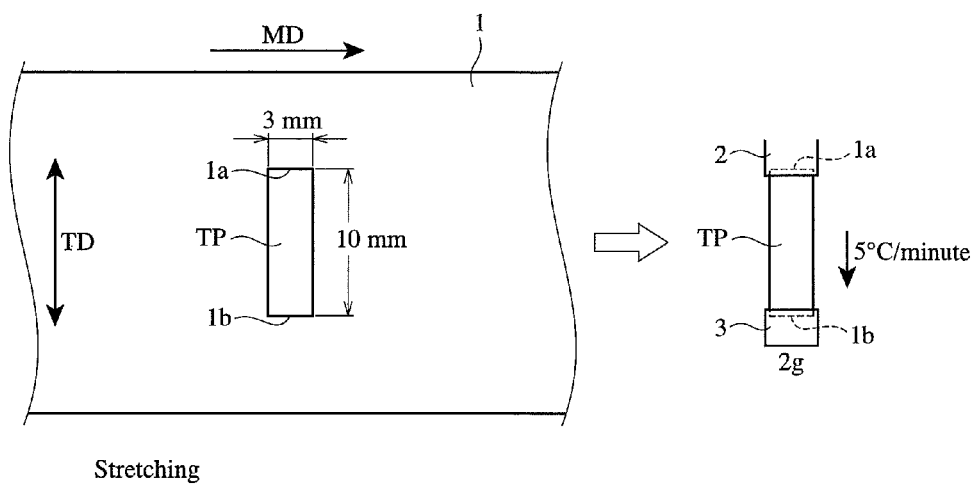
FIG. 2 is a schematic view showing a method for measuring a meltdown temperature.

Meltdown temperature was measured using a thermomechanical analyzer (TMA/SS6000 available from Seiko Instruments Inc.). The measurement was made as follows: a membrane test piece TP of 10 mm (TD) and 3 mm (MD) was heated from room temperature at a rate of 5° C./minute under a load of 2 g according to the method shown in FIG. 2. The temperature at which the test piece TP elongated by 50% of the original length (100%) at room temperature was used as a measure of the "meltdown temperature."

(9) Pore Size Distribution of First Microporous Layer

The pore size distribution of a first microporous layer membrane constituting the two or three-layer, microporous polyolefin membrane was determined from a pore size distribution curve obtained by mercury intrusion porosimetry. Pore size distribution of microporous polyolefin membrane is measured by a device "Poresizer Type 9320, manufacturing by Micrometritics Ltd." An area of measurement pressure ranges from about 3.7 kPa to about 207 MPa. A volume of a cell is 15 cm³. A value of contact angle and surface tension for mercury were used 141.3° and 484 dyn/cm respectively.

(10) Pore Volume Ratio in First Microporous Layer

Calculated from $S_1/S_2$ shown in FIG. 1.

(11) Surface Roughness

The maximum height difference of a surface of a first microporous layer measured by AFM in a dynamic force mode (DFM) was used as surface roughness.

(12) Electrolytic Solution Absorption Rate

Using a kinetic-surface-tension-measuring apparatus (DCAT21 with high-precision electronic balance, available from Eko Instruments Co., ltd.), a triple-layer, microporous polyolefin membrane sample was immersed in an electrolytic solution (electrolyte: $LiPF_6$, electrolyte concentration: 1 mol/L, solvent: ethylene carbonate/dimethyl carbonate at a volume ratio of 3/7) kept at 18° C., to determine an electrolytic solution absorption rate by the formula of [increased weight (g) of microporous polyolefin membrane/weight (g) of microporous polyolefin membrane before absorption]. The absorption rate is expressed by a relative ratio, assuming that the absorption rate (g/g) of the microporous polyolefin membrane of Comparative Example 1 is 1.

(13) Thickness Variation Ratio After Heat Compression (%)

A microporous polyolefin membrane sample was sandwiched by a pair of highly flat plates, and heat-compressed by a press machine under a pressure of 2.2 MPa (22 kgf/cm²) at 90° C. for 5 minutes, to determine an average thickness in the same manner as above. A thickness variation ratio was calculated by the formula of (average thickness after compression−average thickness before compression)/(average thickness before compression)×100.

(14) Air permeability After Heat Compression (sec/100 cm³/20 μm)

Each microporous polyolefin membrane having a thickness of $T_1$ was heat-compressed under the above conditions, and measured with respect to air permeability $P_1$ according to JIS P8117. The measured air permeability $P_1$ was converted to air permeability $P_2$ at a thickness of 20 μm by the equation of $P_2=(P_1\times20)/T_1$.

TABLE 1

| No. | | Example 1 | Example 2 | Example 3 |
|---|---|---|---|---|
| | | First Polyolefin | | |
| UHMWPE | $Mw^{(1)}/MWD^{(2)}$/% by mass | $2.0\times10^6$/8/2 | $2.0\times10^6$/8/2 | $2.0\times10^6$/8/2 |
| HDPE | Mw/MWD/% by mass | $3.0\times10^5$/8.6/98 | $3.0\times10^5$/8.6/98 | $3.0\times10^5$/8.6/98 |
| PE Composition | Mw/MWD | $3.3\times10^5$/9.4 | $3.3\times10^5$/9.4 | $3.3\times10^5$/9.4 |
| | $Tm(° C.)^{(3)}/Tcd\ (° C.)^{(4)}$ | 135/100 | 135/100 | 135/100 |
| PP | Mw/% by mass | —/— | —/— | —/— |

TABLE 1-continued

| | | | | |
|---|---|---|---|---|
| Second Polyolefin | | | | |
| UHMWPE | Mw/MWD/% by mass | $2.0 \times 10^6/8/100$ | $2.0 \times 10^6/8/50$ | $5.0 \times 10^6/8.2/30$ |
| HDPE | Mw/MWD/% by mass | —/—/— | $3.0 \times 10^5/8.6/50$ | $3.0 \times 10^5/8.6/70$ |
| PE Composition | Mw/MWD | —/— | $1.2 \times 10^6/18.7$ | $8.1 \times 10^5/17.2$ |
| | Tm(° C.)/Tcd (° C.) | —/— | 135/100 | 135/100 |
| Production Conditions | | | | |
| Concentration[5] (% by mass) | | 40/5 | 40/15 | 40/25 |
| Simultaneous Extrusion | | | | |
| Layer Structure[6] | | (I)/(II)/(I) | (I)/(II)/(I) | (I)/(II)/(I) |
| Layer Thickness Ratio[7] | | 1/0.2/1 | 1/1/1 | 1/0.5/1 |
| Stretching of Multi-Layer, Gel-Like Sheet | | | | |
| Temperature (° C.) | | 116.5 | 117 | 117 |
| Magnification (MD × TD) | | 5 × 5 | 5 × 5 | 5 × 5 |
| Stretching of Multi-Layer, Microporous Membrane | | | | |
| Temp. (°C.)/Direction/Magnification (folds) | | 127/TD/1.4 | 126/TD/1.4 | 127/TD/1.4 |
| Heat-Setting | | | | |
| Temperature (° C.)/Time (minute) | | 127/10 | 126/10 | 127/10 |
| Properties of Multi-Layer, Microporous Membrane | | | | |
| Average Thickness (μm) | | 21.5 | 24.5 | 20.2 |
| Layer Thickness Ratio[7] | | 1/0.02/1 | 1/0.2/1 | 1/0.2/1 |
| Air Permeability (sec/100 cm³/20 μm) | | 192 | 335 | 185 |
| Porosity (%) | | 44.9 | 46.7 | 45.1 |
| Pin Puncture Strength (mN/20 μm) | | 5,684 | 6,624.8 | 6,076 |
| Tensile Rupture Strength (kPa) in MD/TD | | 126,332/164,836 | 139,748/169,540 | 122,402/159,936 |
| Tensile Rupture Elongation (%) in MD/TD | | 160/180 | 165/175 | 145/175 |
| Heat Shrinkage Ratio (%) in MD/TD | | 4.9/5.2 | 6.3/5.9 | 6/6.2 |
| Meltdown Temperature (° C.) | | 158 | 159 | 161 |
| Higher-Order Structure | | | | |
| Peaks (μm) in Pore Size Distribution[8] | | 0.05/0.1/0.7/1 | 0.05/0.1/0.7/1 | 0.05/0.1/0.7/1 |
| Pore Volume Ratio[9] | | 1.13 | 1.63 | 1.30 |
| Surface Roughness[10] (nm) | | $5.8 \times 10^2$ | $5.8 \times 10^2$ | $5.8 \times 10^2$ |
| Electrolytic solution Absorption Rate | | 3.8 | 2.9 | 3.6 |
| Thickness Variation Ratio After | | −18 | −19 | −20 |
| Heat Compression (%) | | | | |
| Air Permeability After Heat Compression (sec/100 cm³/20 μm) | | 590 | 722 | 523 |

| No. | | Example 4 | Example 5 | Example 6 |
|---|---|---|---|---|
| First Polyolefin | | | | |
| UHMWPE | Mw[1]/MWD[2]/% by mass | $2.0 \times 10^6/8/2$ | $2.0 \times 10^6/8/2$ | $2.0 \times 10^6/8/2$ |
| HDPE | Mw/MWD/% by mass | $3.0 \times 10^5/8.6/98$ | $3.0 \times 10^5/8.6/93$ | $3.0 \times 10^5/8.6/98$ |
| PE Composition | Mw/MWD | $3.3 \times 10^5/9.4$ | $3.3 \times 10^5/9.5$ | $3.3 \times 10^5/9.4$ |
| | Tm(° C.)[3]/Tcd (° C.)[4] | 135/100 | 135/100 | 135/100 |
| PP | Mw/% by mass | —/— | $5.3 \times 10^5/5$ | —/— |
| Second Polyolefin | | | | |
| UHMWPE | Mw/MWD/% by mass | $2.0 \times 10^6/8/100$ | $2.0 \times 10^6/8/100$ | $2.0 \times 10^6/8/50$ |
| HDPE | Mw/MWD/% by mass | —/—/— | —/—/— | $3.0 \times 10^5/8.6/50$ |
| PE Composition | Mw/MWD | —/— | —/— | $1.2 \times 10^6/18.7$ |
| | Tm(° C.)/Tcd (° C.) | —/— | —/— | 135/100 |
| Production Conditions | | | | |
| Concentration[5] (% by mass) | | 40/5 | 40/5 | 40/20 |
| Simultaneous Extrusion | | | | |
| Layer Structure[6] | | (I)/(II)/(I)[8] | (I/(II)/(I) | (II)/(I) |
| Layer Thickness Ratio[7] | | 1/0.2/1 | 1/0.5/1 | 1/1 |
| Stretching of Multi-Layer, Gel-Like Sheet | | | | |
| Temperature (° C.) | | 117.5 | 117.5 | 117.5 |
| Magnification (MD × TD) | | 5 × 5 | 5 × 5 | 5 × 5 |
| Stretching of Multi-Layer, Microporous Membrane | | | | |
| Temp. (° C.)/Direction/Magnification (folds) | | 127/TD/1.6 | 127/TD/1.4 | 127/TD/1.4 |
| Heat-Setting | | | | |
| Temperature (° C.)/Time (minute) | | 127/10 | 127/10 | 127/10 |

TABLE 1-continued

Properties of Multi-Layer, Microporous Membrane

| | | | |
|---|---|---|---|
| Average Thickness (μm) | 21 | 20.5 | 19.2 |
| Layer Thickness Ratio[7] | 1/0.02/1 | 1/0.03/1 | 0.5/1[11] |
| Air Permeability(sec/100 cm$^3$/20 μm) | 159 | 195 | 197 |
| Porosity (%) | 45.8 | 45.5 | 45.4 |
| Pin Puncture Strength (mN/20 μm) | 5,448.8 | 5,635 | 4,802 |
| Tensile Rupture Strength (kPa) in MD/TD | 123,970/173,950 | 125,440/158,760 | 122,500/136,220 |
| Tensile Rupture Elongation (%) in MD/TD | 165/155 | 155/175 | 160/175 |
| Heat Shrinkage Ratio (%) in MD/TD | 4.5/6.0 | 4.8/4.9 | 3.8/5.5 |
| Meltdown Temperature (° C.) | 158 | 158 | 158 |
| Higher-Order Structure | | | |
| Peaks (μm) in Pore Size Distribution[8] | 0.05/0.1/0.8/1.1 | 0.05/0.1/0.7/1 | 0.05/0.1/0.7/1 |
| Pore Volume Ratio[9] | 0.91 | 1.18 | 1.74 |
| Surface Roughness[10] (nm) | 6.0 × 10$^2$ | 5.2 × 10$^2$ | 5.6 × 10$^2$ |
| Electrolytic solution Absorption Rate | 3.9 | 3.5 | 3 |
| Thickness Variation Ratio After Heat Compression (%) | −22 | −18 | −19 |
| Air Permeability After Heat Compression (sec/100 cm$^3$/20 μm) | 492 | 575 | 624 |

| No. | | Example 7 | Com. Ex. 1 | Com. Ex. 2 |
|---|---|---|---|---|
| First Polyolefin | | | | |
| UHMWPE | Mw$^{(1)}$/MWD$^{(2)}$/% by mass | —/—/— | 2.0 × 10$^6$/8/2 | 2.0 × 10$^6$/8/2 |
| HDPE | Mw/MWD/% by mass | 3.0 × 10$^5$/8.6/100 | 3.0 × 10$^5$/8.6/98 | 3.0 × 10$^5$/8.6/98 |
| PE Composition | Mw/MWD | —/— | 3.3 × 10$^5$/9.4 | 3.3 × 10$^5$/9.4 |
| | Tm(° C.)$^{(3)}$/Tcd (° C.)$^{(4)}$ | —/— | 135/100 | 135/100 |
| PP | Mw/% by mass | —/— | —/— | —/— |
| Second Polyolefin | | | | |
| UHMWPE | Mw/MWD/% by mass | 2.0 × 10$^6$/8/50 | 2.0 × 10$^6$/8/100 | 2.0 × 10$^6$/8/100 |
| HDPE | Mw/MWD/% by mass | 3.0 × 10$^5$/8.6/50 | —/—/— | —/—/— |
| PE Composition | Mw/MWD | 1.2 × 10$^6$/18.7 | —/— | —/— |
| | Tm(° C.)/Tcd (° C.) | 135/100 | —/— | —/— |
| Production Conditions | | | | |
| Concentration$^{(5)}$(% by mass) | | 40/15 | 40/7 | 40/5 |
| Simultaneous Extrusion | | | | |
| Layer Structure$^{(6)}$ | | (I/(II)/(I) | (I/(II)/(I) | (I)/(II)/(I) |
| Layer Thickness Ratio$^{(7)}$ | | 1/0.5/1 | 1/2/1 | 1/0.05/1 |
| Stretching of Multi-Layer, Gel-Like Sheet | | | | |
| Temperature (° C.) | | 117.5 | 118 | 118 |
| Magnification (MD × TD) | | 5 × 5 | 5 × 5 | 5 × 5 |
| Stretching of Multi-Layer, Microporous Membrane | | | | |
| Temp. (° C.)/Direction/Magnification (folds) | | 127/TD/1.4 | 128/TD/1.4 | 129/TD/1.4 |
| Heat-Setting | | | | |
| Temperature (° C.)/Time (minute) | | 127/10 | 128/10 | 129/10 |
| Properties of Multi-Layer, Microporous Membrane | | | | |
| Average Thickness (μm) | | 19.2 | 23.7 | 20.1 |
| Layer Thickness Ratio$^{(7)}$ | | 1/0.1/1 | 1/1/1 | 1/0.01/1 |
| Air Permeability (sec/100 cm$^3$/20 μm) | | 170 | 227 | 234 |
| Porosity (%) | | 44.5 | 42.5 | 41.5 |
| Pin Puncture Strength (mN/20 μm) | | 5,782 | 4,978.4 | 4,645.2 |
| Tensile Rupture Strength (kPa) in MD/TD | | 118,580/148,960 | 106,232/122,990 | 117,600/154,840 |
| Tensile Rupture Elongation (%) in MD/TD | | 130/160 | 175/190 | 170/180 |
| Heat Shrinkage Ratio (%) in MD/TD | | 6.5/5.5 | 3.3/3.8 | 3.5/4 |
| Meltdown Temperature (° C.) | | 157 | 159 | 148 |
| Higher-Order Structure | | | | |
| Peaks (μm) in Pore Size Distribution$^{(8)}$ | | 0.05/0.1/0.7/1 | 0.05/0.1/0.7/1 | 0.05/0.1/0.7/1 |
| Pore Volume Ratio$^{(9)}$ | | 1.66 | 2.70 | 1.10 |
| Surface Roughness$^{(10)}$ (nm) | | 5.0 × 10$^2$ | 5 × 10$^2$ | 5.8 × 10$^2$ |
| Electrolytic solution Absorption Rate | | 3.2 | 1.8 | 3.6 |
| Thickness Variation Ratio After Heat Compression (%) | | −19 | −23 | −19 |
| Air Permeability After Heat Compression (sec/100 cm$^3$/20 μm) | | 654 | 824 | 554 |

TABLE 1-continued

| No. | | Com. Ex. 3 | Com. Ex. 4 |
|---|---|---|---|
| First Polyolefin | | | |
| UHMWPE | Mw[(1)]/MWD[(2)]/% by mass | $2.0 \times 10^6$/8/2 | —/—/— |
| HDPE | Mw/MWD/% by mass | $3.0 \times 10^5$/8.6/98 | —/—/— |
| PE Composition | Mw/MWD | $3.3 \times 10^5$/9.4 | —/— |
| | Tm(° C.)[(3)]/Tcd (° C.)[(4)] | 135/100 | —/— |
| PP | Mw/% by mass | —/— | —/— |
| Second Polyolefin | | | |
| UHMWPE | Mw/MWD/% by mass | —/—/— | $2.0 \times 10^6$/8/18 |
| HDPE | Mw/MWD/% by mass | —/—/— | $3.0 \times 10^5$/13.5/82 |
| PE Composition | Mw/MWD | —/— | $6.5 \times 10^5$/20.9 |
| | Tm(° C.)/Tcd (° C.) | —/— | 135/100 |
| Production Conditions | | | |
| Concentration[(5)] (% by mass) | | 40/— | —/30 |
| Simultaneous Extrusion | | | |
| Layer Structure[(6)] | | — | — |
| Layer Thickness Ratio[(7)] | | — | — |
| Stretching of Multi-Layer, Gel-Like Sheet | | | |
| Temperature (° C.) | | 118.5 | 115 |
| Magnification (MD × TD) | | 5 × 5 | 5 × 5 |
| Stretching of Multi-Layer, Microporous Membrane | | | |
| Temp. (° C.)/Direction/Magnification (folds) | | 129/TD/1.4 | 124.5/TD/1.4 |
| Heat-Setting | | | |
| Temperature (° C.)/Time (minute) | | 129/0.2 | 124.5/0.2 |
| Properties of Multi-Layer, Microporous Membrane | | | |
| Average Thickness (μm) | | 19.5 | 20 |
| Layer Thickness Ratio[(7)] | | — | — |
| Air Permeability (sec/100 cm³/20 μm) | | 212 | 420 |
| Porosity (%) | | 41.2 | 37.2 |
| Pin Puncture Strength (mN/20 μm) | | 4,488.4 | 4,655 |
| Tensile Rupture Strength (kPa) in MD/TD | | 117,110/155,820 | 166,600/133,280 |
| Tensile Rupture Elongation (%) in MD/TD | | 175/185 | 150/230 |
| Heat Shrinkage Ratio (%) in MD/TD | | 3.5/4 | 7.5/5.5 |
| Meltdown Temperature (° C.) | | 146 | 150 |
| Higher-Order Structure | | | |
| Peaks (μm) in Pore Size Distribution[(8)] | | 0.05/0.1/0.7/1 | 0.045/—/—/— |
| Pore Volume Ratio[(9)] | | 1.10 | — |
| Surface Roughness[(10)] (nm) | | $5.8 \times 10^2$ | $2.0 \times 10^2$ |
| Electrolytic solution Absorption Rate | | 3.8 | 1.0 |
| Thickness Variation Ratio After Heat Compression (%) | | −18 | −18 |
| Air Permeability After Heat Compression (sec/100 cm³/20 μm) | | 524 | 1,525 |

Note:
[(1)]Mw represents weight-average molecular weight.
[(2)]The molecular weight distribution represented by weight-average molecular weight/number-average molecular weight (Mw/Mn).
[(3)]Tm represents the melting point of the polyethylene composition.
[(4)]Tcd represents the crystal dispersion temperature of the polyethylene composition.
[(5)]The concentration of the first polyolefin solution and the concentration of the second polyolefin solution.
[(6)]The layer structure of surface layer/inner layer/surface layer, and (I) represents the first polyolefin solution, and (II) represents the second polyolefin solution.
[(7)]The thickness ratio of surface layer/inner layer/surface layer.
[(8)]First to fourth peaks (μm) in the pore size distribution of the first microporous layer.
[(9)]The pore volume ratio in the first microporous layer.
[(10)]Surface roughness (maximum height difference) measured by AFM in a dynamic force mode (DFM).
[(11)]The thickness ratio of the first microporous layer/the second microporous layer.

As is clear from Table 1, each three-layer, microporous polyolefin membrane of Examples 1-7 had a structure in which the first microporous layer had a hybrid structure, thereby exhibiting favorable and well-balanced electrolytic solution absorption and compression resistance properties. They further had favorable and well-balanced permeability, pin puncture strength, tensile rupture strength, tensile rupture elongation, heat shrinkage resistance and meltdown properties.

It is believed that the three-layer, the microporous polyolefin membrane of Comparative Example 1 was poorer than those of Examples 1-7 in electrolytic solution absorption, because the thickness ratio of the second microporous layer to the first microporous layer (first microporous layer/second microporous layer/first microporous layer) was more than 1/0.95/1. It is believed that the three-layer, microporous polyolefin membrane of Comparative Example 2 was poorer than those of Examples 1-7 in pin puncture strength and meltdown properties, because the thickness ratio of the second microporous layer to the first microporous layer (first microporous layer/second microporous layer/first microporous layer) was less than 1/0.015/1. It is believed that the non-multi-layer, microporous polyolefin membrane of Comparative Example 3 was poorer than those of Examples 1-7 in pin puncture strength and meltdown properties, because the membrane of Comparative Example 3 did not have the second microporous layer in which the percentage of the ultra-high-molecular-weight polyethylene was 8% or more by mass. It is believed that the non-multi-layer, microporous polyolefin membrane of Comparative Example 4 was poorer than those of Examples 1-7 in air permeability after heat compression and electrolytic solution absorption, because the membrane of Comparative Example 4 did not have the first microporous layer having a hybrid structure.

EFFECT OF THE INVENTION

The invention relates in part to multi-layer, microporous polyolefin membranes having suitably well-balanced permeability, mechanical strength, heat shrinkage resistance, meltdown properties, electrolytic solution absorption, and compression resistance properties; and to methods for making and using such membranes. Separators formed from such multi-layer, microporous polyolefin membrane provide batteries with suitable safety, heat resistance, storage properties, and productivity.

The invention claimed is:

1. A multi-layer, microporous polyolefin membrane comprising three or more layers, including (a) a first microporous layer constituting each outer layer and comprising polyethylene and polypropylene, wherein the polyethylene contains 7% or less by mass of ultra-high-molecular-weight polyethylene based on the total mass of the polyethylene in the first microporous layer, wherein the polypropylene content is 25% or less by mass based on the total mass of the polyethylene and the polypropylene in the first microporous layer, and wherein the ultra-high-molecular-weight polyethylene has a weight-average molecular weight of $1 \times 10^6$ or more, the first microporous layer having a structure in which a pore size distribution curve obtained by mercury intrusion porosimetry has at least two peaks, and (b) a second microporous layer constituting at least one intermediate layer comprising polyethylene containing 8% or more by mass of ultra-high-molecular-weight polyethylene based on the total mass of the polyethylene in the second microporous layer, wherein the first microporous layer comprises dense domains having a main peak in a range of 0.01 to 0.07 μm, and coarse domains having at least one sub-peak in a range of more than 0.08 μm and 1.5 μm or less in the pore size distribution curve.

2. The multi-layer, microporous polyolefin membrane according to claim 1, wherein the ratio of the pore volume of the dense domains to the pore volume of the coarse domains ranges from 0.5 to 49.

3. A battery separator formed by the multi-layer, microporous polyolefin membrane recited in claim 1.

4. A battery comprising a separator formed by the multi-layer, microporous polyolefin membrane recited in claim 1.

5. The multi-layer, microporous polyolefin membrane according to claim 1, wherein the coarse domains have at least one sub-peak in a range of 1 to 1.1 μm in the pore distribution curve.

* * * * *